United States Patent
Maeshima

(10) Patent No.: US 9,912,212 B2
(45) Date of Patent: Mar. 6, 2018

(54) MOTOR DRIVE DEVICE FOR ELECTRIC POWER STEERING INCLUDING HEAT SINK AND EXTERNAL CONNECTOR

(71) Applicant: NIDEC ELESYS CORPORATION, Kawasaki-shi, Kanagawa (JP)

(72) Inventor: Osamu Maeshima, Kawasaki (JP)

(73) Assignee: NIDEC ELESYS CORPORATION, Kanagawa (JP)

(*) Notice: Subject to any disclaimer, the term of this patent is extended or adjusted under 35 U.S.C. 154(b) by 488 days.

(21) Appl. No.: 14/576,762

(22) Filed: Dec. 19, 2014

(65) Prior Publication Data

US 2015/0180316 A1    Jun. 25, 2015

(30) Foreign Application Priority Data

| Dec. 19, 2013 | (JP) | 2013-262629 |
| Dec. 19, 2013 | (JP) | 2013-262656 |
| Dec. 19, 2013 | (JP) | 2013-262678 |
| Dec. 19, 2013 | (JP) | 2013-262706 |
| Dec. 19, 2013 | (JP) | 2013-262737 |
| Dec. 17, 2014 | (JP) | 2014-255572 |

(51) Int. Cl.
| H02K 5/22  | (2006.01) |
| H02K 11/00 | (2016.01) |
| B62D 5/04  | (2006.01) |
| H02K 11/33 | (2016.01) |
| H02K 9/22  | (2006.01) |

(52) U.S. Cl.
CPC ....... *H02K 11/0073* (2013.01); *B62D 5/0406* (2013.01); *H02K 5/225* (2013.01); *H02K 11/33* (2016.01); *H02K 9/22* (2013.01)

(58) Field of Classification Search
CPC ...... H02K 11/0073; H02K 11/33; H02K 5/22; H02K 5/225; H02K 9/22; B62D 5/0406; B62D 5/0403
USPC ............................................. 310/71, 64, 89
See application file for complete search history.

(56) References Cited

U.S. PATENT DOCUMENTS

| 2007/0089927 A1* | 4/2007 | Kim ..................... B62D 5/0406 |
| | | 180/444 |
| 2011/0254411 A1* | 10/2011 | Minato ................. H02K 11/33 |
| | | 310/68 C |
| 2012/0160596 A1* | 6/2012 | Yamasaki ............. H02K 5/225 |
| | | 310/71 |

FOREIGN PATENT DOCUMENTS

| JP | 2002-345211 A | 11/2002 |
| JP | 2011-228379 A | 11/2011 |
| JP | 2011-239574 A | 11/2011 |
| JP | 2012-143036 A | 7/2012 |
| JP | 2012-197051 A | 10/2012 |
| JP | 2012-200088 A | 10/2012 |
| JP | 2013-063689 A | 4/2013 |

* cited by examiner

*Primary Examiner* — Michael Andrews
(74) *Attorney, Agent, or Firm* — Keating & Bennett, LLP

(57) ABSTRACT

In this motor drive device, a motor case which stores a motor and a controller case which stores a controller of controlling the motor are unitarily coupled to each other in a direction of the rotating shaft of the motor. In addition, a connection portion for an external connector included in the controller is also provided in the direction of the rotating shaft of the motor. Such a structure achieves a small and compact structure which can be connected in the direction of the rotating shaft.

10 Claims, 14 Drawing Sheets

MOTOR DRIVE DEVICE FOR ELECTRIC POWER STEERING INCLUDING HEAT SINK AND EXTERNAL CONNECTOR

FIELD OF THE INVENTION

The present invention relates to a motor drive device for an electric power steering device. This motor drive device includes a motor and an electronic control unit (abbreviated as ECU) for controlling the motor.

In this field a device which controls an actuator such as a motor or the like has been called generally as ECU. The ECU or the electrical control unit includes a power module or power converter, a heat sink, a controller and a connector.

DESCRIPTION OF THE RELATED ART

A vehicle, such as an automobile, may include an electric power steering device. An electric power steering device generates an assist torque that assists a steering torque in a steering system generated by a driver's operation to a steering handle. The generation of assist torque allows an electric power steering device to reduce the load on the driver. An assist torque mechanism that applies an assist torque causes a torque sensor to detect the steering torque in the steering system, causes an electronic control unit to generate a drive signal on the basis of the detected signal, causes an electric motor to generate the assist torque according to the steering torque on the basis of the drive signal, and transmits the assist torque to the steering system via a reduction mechanism.

For instance, Japanese Patent Laid-Open No. 2002-345211 discloses the structure of an electronic control unit for an electric power steering. Here, the control board 43, the metal board 41 and the like (electronic control unit) in FIG. 1 in Japanese Patent Laid-Open No. 2002-345211 is unitarily formed with the electric motor (electric motor) 4. In other words, the control board 43, the metal board 41 and the like and the electric motor 40 form the single control device 40 in FIG. 1 or 7 in Japanese Patent Laid-Open No. 2002-345211. Furthermore, according to the details of FIG. 1 or 3 in Japanese Patent Laid-Open No. 2002-345211, the power source connector 44 and the torque sensor connector 45 are provided so as to protrude outside in the radial direction from the circuit case 42. Moreover, according to the description of paragraph [0020] in Japanese Patent Laid-Open No. 2002-345211, the metal board 41 is in close contact with the heat sink 80 disposed between the metal board 41 and the electric motor 40. Thus, heat generated by the heat generating components on the metal board 41 is transferred to the heat sink 80.

Likewise, for instance, Japanese Patent Laid-Open No. 2012-143036 discloses the structure of an electronic control unit for an electric power steering. Here, the control board 71, power board 61 and the like (electronic control unit) in FIG. 2 in Japanese Patent Laid-Open No. 2012-143036 are unitarily formed with the motor (electric motor) 40. In other words, the control board 71, power board 61 and the like and the motor 40 form the single controller 50 in FIG. 2 or 6 in Japanese Patent Laid-Open No. 2012-143036. According to the details of FIG. 5 or 7 in Japanese Patent Laid-Open No. 2012-143036, the power source connector 44 and the torque signal connector 53 are provided so as to protrude outside in the radial direction from the motor case 41. Thus, the height in the axial direction of the motor 40 is reduced. Furthermore, according to the description of paragraph [0024] in Japanese Patent Laid-Open No. 2012-143036, the control board 71 is attached to the heat radiation block 81 or the heat sink 80 disposed between the control board 71 and the power board 61.

In general, it is preferred that an electronic control unit for an electric power steering be small. Unfortunately, the present inventor recognizes that in the case where an electronic control unit is disposed in parallel with a gear box of a power steering device, it is difficult to attach the electronic control unit to the gearbox. In general, it is preferred that an electronic control unit for an electric power steering has high heat radiation efficiency. Unfortunately, it is difficult for those skilled in the art to design an electronic control unit for an electric power steering that has high heat radiation efficiency.

For instance, Japanese Patent Laid-Open No. 2013-63689 discloses a structure of an electronic control unit for an electric power steering. Here, the first printed circuit board (control board) 14, the metal board (power board) 16 and the like (electronic control unit) in FIG. 2 in Japanese Patent Laid-Open No. 2013-63689 are unitarily formed with the electric motor 8 in FIG. 3. According to the details of FIG. 1 in Japanese Patent Laid-Open No. 2013-63689, one end of the signal amplifier 26 is disposed on the metal board 16, while the other end of the signal amplifier 26 is disposed at the microcomputer 25 (see alternate long and short dashed lines in FIG. 1 in Japanese Patent Laid-Open No. 2013-63689) on the first printed circuit board 14. Heat generated by the microcomputer 25 is transferred to the metal board 16.

In general, it is preferred that an electronic control unit for an electric power steering be small. Unfortunately, for instance, the first printed circuit board 14 in Japanese Patent Laid-Open No. 2013-63689 requires that the microcomputer 25 is disposed at a position corresponding to the signal amplifier 26. Accordingly, the flexibility in designing the first printed circuit board 14 is low. In general, it is preferred that an electronic control unit for an electric power steering has high heat radiation efficiency. Unfortunately, it is difficult for those skilled in the art to design an electronic control unit for an electric power steering having high heat radiation efficiency.

Furthermore, for instance, Japanese Patent Laid-Open No. 2011-228379 discloses a structure of an electronic control unit for an electric power steering. Here, the control board 30, the power module 16 and the like (electronic control unit) in FIG. 7 in Japanese Patent Laid-Open No. 2011-228379 are unitarily formed with the electric motor or the motor case (motor cover) 11. Moreover, according to the description of abstract in Japanese Patent Laid-Open No. 2011-228379, the radiation surfaces 59 of the power module 16 is in close contact with the heat sink 80 via the insulation radiation sheet 69. Accordingly, heat generated by the heat generating components in the power module 16 is transferred to the heat sink 80.

In general, it is preferred that an electronic control unit for an electric power steering has high heat radiation efficiency. Unfortunately, it is difficult for those skilled in the art to design an electronic control unit for an electric power steering having high heat radiation efficiency. In particular, in the power module 16 in Japanese Patent Laid-Open No. 2011-228379, the heat radiation surface 59 are limited to the power transistors (inverter circuits 1 and 2) 51 to 58 and 61 to 68 and the shunt resistor 76. Accordingly, heat generated in the power module 16, where a large current flows, on the side of the output terminal (e.g., the energizing paths between the inverter circuits 1 and 2 and the electric motor in Japanese Patent Laid-Open No. 2011-228379) is not radiated. The heat therefore increases the temperatures of the power transistors 51 to 58 and 61 to 68. In general, it is preferred that an electronic control unit for an electric power steering be small. Unfortunately, the present inventor recognizes that, for instance, in the case where the electronic control unit is disposed in parallel to the gearbox, it is difficult to attach the electronic control unit to the gearbox.

SUMMARY OF THE INVENTION nt application is a motor drive device for an electric power steering which is supplied with a power source from an outside and which includes a connection which connects an external signal to and from the outside, comprising: a motor which includes a rotating shaft and is stored in a motor case; a controller which is disposed adjacent to the motor in a direction of the rotating shaft and controls the motor; and an external connector which includes a power source connector configured to receive the power source and/or a signal connector configured to be connected to the external signal, wherein the controller includes at least: a controller case which includes a flat plate extending in a direction perpendicular to the rotating shaft, and an external wall having a cylindrical shape in a circumferential direction; a power module or power converter configured by a component including an inverter circuit which supplies the motor with a drive power; a control board which controls the power module or power converter and the motor; and a heat sink which is made of metal, wherein, the motor case and the controller case are formed unitarily by mutually coupling portions or all of the motor case and the control unit case in the direction of the rotating shaft directly or indirectly via a connection member, the external connector includes a connection port which is connected to the power source and the external signal in the direction of the rotating shaft, and a portion or an entirety of the external wall and a portion or an entirety of the flat plate of the controller case are defined by the heat sink.

In this motor drive device, a motor case that stores a motor and a controller case that stores a controller of controlling the motor are unitarily coupled to each other in the direction of the rotating shaft of the motor. In addition, a connection port for an external connector included in the controller is also provided in the direction of the rotating shaft of the motor. Such a structure achieves a small and compact structure that can be connected in the direction of the rotating shaft. In particular, it is advantageous to achieve a motor drive device that is narrow in the radial direction.

In addition, the control unit case transfers heat generated by power consumption and the like, and serves also as a heat sink for cooling with outside air, thus achieving an efficient cooling structure. The control unit case includes the flat plate extending in the direction perpendicular to the rotating shaft, and the external wall having the cylindrical shape in the circumferential direction. The outer circumference of the external wall is in contact with the outside air. The portion or the entirety of the flat plate and the external wall of this controller case have the structure made by metal die casting. The flat plate thus has the structure in contact with the power module, the structure encompassing an indirect structure, described later. Accordingly, this structure efficiently absorbs heat generated by the power module and the like. The heat is transferred to the external wall formed in a coupled and unitary manner with the flat plate, and released to the outside air from the outer circumferential surface of the external wall. Preferably, the entire external wall serves as a heat sink. Alternatively, a part of the external wall may serve as a heat sink. Preferably, portions having a structure in contact with the power module as a heat generating portion serve as a heat sink. Accordingly, the other portions of the flat plate do not necessarily serve as a heat sink. In comparison with the case of including a heat sink separately from the controller case, the present structure can achieve a more compact and smaller motor drive device.

Another preferable embodiment (second embodiment) of the present application is a motor drive device for an electric power steering which is supplied with a power source from an outside and which includes a connection configured to connect an external signal to and from the outside, comprising: a motor which includes a rotating shaft and is stored in a motor case; a controller which is disposed adjacent to the motor in a direction of the rotating shaft and controls the motor; and an external connector which includes a power source connector configured to receive the power source and/or a signal connector configured to be connected to the external signal, wherein the controller includes at least: a controller case which includes a flat plate extending in a direction perpendicular to the rotating shaft, and an external wall having a cylindrical shape in a circumferential direction; a power module defined by a component including an inverter circuit which supplies the motor with a drive power; a control board which controls the power module; and a heat sink which is made of metal, wherein, the motor case and the controller case are formed unitarily by mutually coupling portions or all of the motor case and the controller case in the direction of the rotating shaft directly or indirectly via a connection member, the external connector includes a connection port which is connected to the power source and the external signal in the direction of the rotating shaft, and the power module includes a module defined by molding or casting an integrated circuit including the inverter circuit with material including resin or ceramic.

As with the first embodiment, in this second embodiment, the motor case and the controller case are coupled unitarily to each other in the direction of the rotating shaft of the motor. This achieves a small and compact structure. In particular, it is advantageous to achieve the motor drive device that is narrow in the radial direction.

In addition, the power module of this embodiment is configured by a power module that is formed by molding an integrated circuit including an inverter circuit with material including resin, ceramic or the like. The power module has a small and compact structure as one power LSI component. The power module may have a structure where multiple bare chips configuring a part of the inverter circuit are disposed on an LSI base. As a result, a complex inverter circuit can be configured, and the designing flexibility can be improved. In addition, in comparison with a substrate structure formed by conventional discrete inverter configuration components, the size is significantly reduced. Accordingly, in comparison with the conventional art, the motor drive device having a significantly reduced size can be achieved.

A still another preferable embodiment (third embodiment) is A motor drive device for an electric power steering which is supplied with a power source from an outside and which includes a connection which is configured to connect the external signal to and from the outside, comprising: a motor which includes a rotating shaft and is stored in a motor case; a controller which is disposed adjacent to the motor in a direction of the rotating shaft and controls the motor; and an external connector which includes a power source connector configured to receive the power source and/or a signal connector configured to be connected to the external signal, wherein the control unit comprises at least: a controller case which includes a flat plate extending in a direction perpendicular to the rotating shaft, and an external wall having a cylindrical shape in a circumferential direction; a power module or power converter defined by a component including an inverter circuit which supplies the motor with a drive power; a control board which controls the power module or power converter and a heat sink which is made of metal, and a metal radiator plate; wherein, the motor case and the controller case are formed unitarily by mutually coupling portions or all of the motor case and the control unit case in the direction of the rotating shaft directly or indirectly via a connection member, the external connector includes a connection port which is connected to the power source and the external signal in the direction of the rotating shaft, and a heat conductive member is disposed between the radiator plate and the power module or power converter, or between the power module or power converter and the heat sink.

As with the first embodiment, in this third embodiment, the motor case and the controller case are unitarily coupled to each other in the direction of the rotating shaft of the motor. Thus, the small and compact structure can be achieved. In particular, it is advantageous to achieve the motor drive device that is narrow in the radial direction.

In addition, this embodiment further includes a metal radiator plate and a heat conductive member. Thus, the motor drive device having a high cooling performance can be achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferable embodiments of the present invention are hereinafter described with reference to the drawings. In the following description, the direction along the rotating shaft (rotation axis) of a motor is referred to as a direction of the rotating shaft, and a direction perpendicular to the rotating shaft is referred to as a radial direction.

Figure 1:
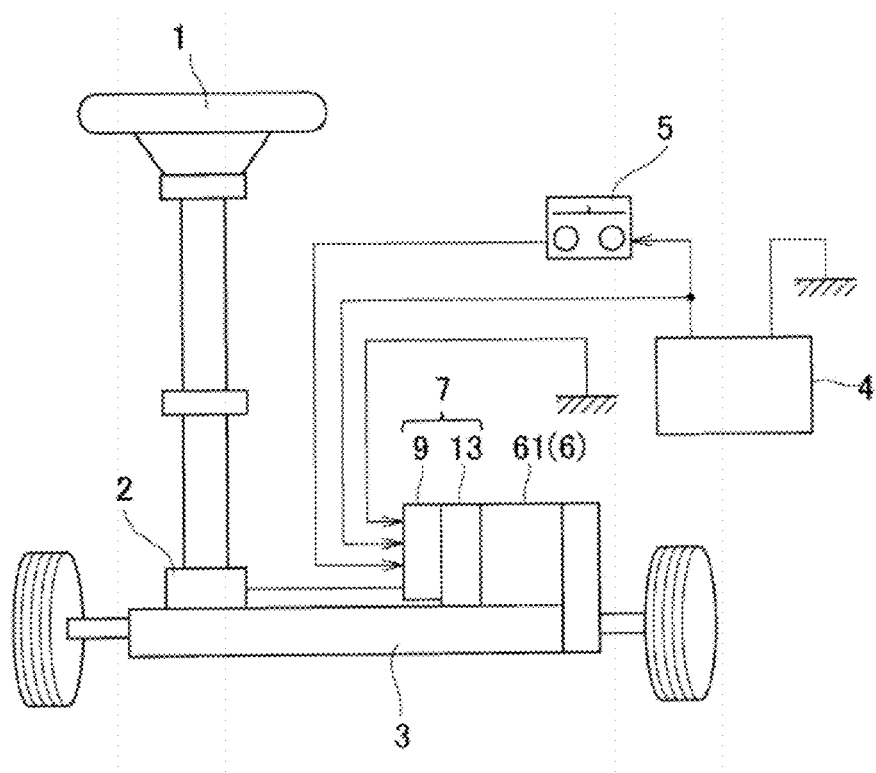
FIG. 1 is a diagram exemplifying a schematic configuration of an electric power steering device.

FIG. 1 shows an example of a schematic configuration of an electric power steering device. In the example in FIG. 1, the electric power steering device includes an electronic control unit 7. More specifically, the electric power steering device includes an assist torque mechanism that applies an assist torque (also referred to as an additional torque) to a steering system from a steering handle (e.g., steering wheel) 1 of a vehicle to steered wheels (e.g., front wheels) of the vehicle.

In the example in FIG. 1, the steering system couples a rotating shaft (also referred to as a pinion shaft or an input shaft) to the steering handle 1 via a steering shaft (also referred to as a steering column) and a universal coupling; the system further couples a rack shaft to the rotating shaft via, for instance, a gearbox 3, which is a rack and pinion mechanism; the system further couples right and left steering wheels to the opposite ends of the rack shaft. The rack and pinion mechanism includes a pinion provided at the rotating shaft and a rack provided at the rack shaft.

Through use of the steering system, a driver can steer the steering handle 1, thereby allowing the steering torque to steer the steered wheels via the rack and pinion mechanism.

In FIG. 1, the assist torque mechanism causes a torque sensor 2 to detect the steering torque of the steering system applied to the steering handle 1, causes an electronic control unit 7 to generate a drive signal on the basis of the detected signal (also referred to as a torque signal), causes an electric motor 6 to generate the assist torque (additional torque) according to the steering torque on the basis of the drive signal, and transmits the assist torque to the rack shaft via a reduction mechanism.

Electric power steering devices can be classified into a pinion assist type, a rack assist type, a column assist type and the like according to a position where the assist torque is applied to the steering system. The electric power steering device in FIG. 1 shows the rack assist type. Alternatively, the electric power steering device may be the pinion assist type, the column assist type or the like.

The electric motor 6 is, for instance, a brushless motor. The rotation angle of the rotor of the brushless motor or the rotation angle of the electric motor 6 (also referred to as a rotation signal) is detected by the electronic control unit 7 (e.g., a microcomputer 25 in FIG. 3). The rotor of the brushless motor is made, for instance, of a permanent magnet. The electronic control unit 7 in FIG. 1 can cause a magnetic detection element 30 in FIG. 3 to detect the movement of the permanent magnet (N pole and S pole).

Figure 3:
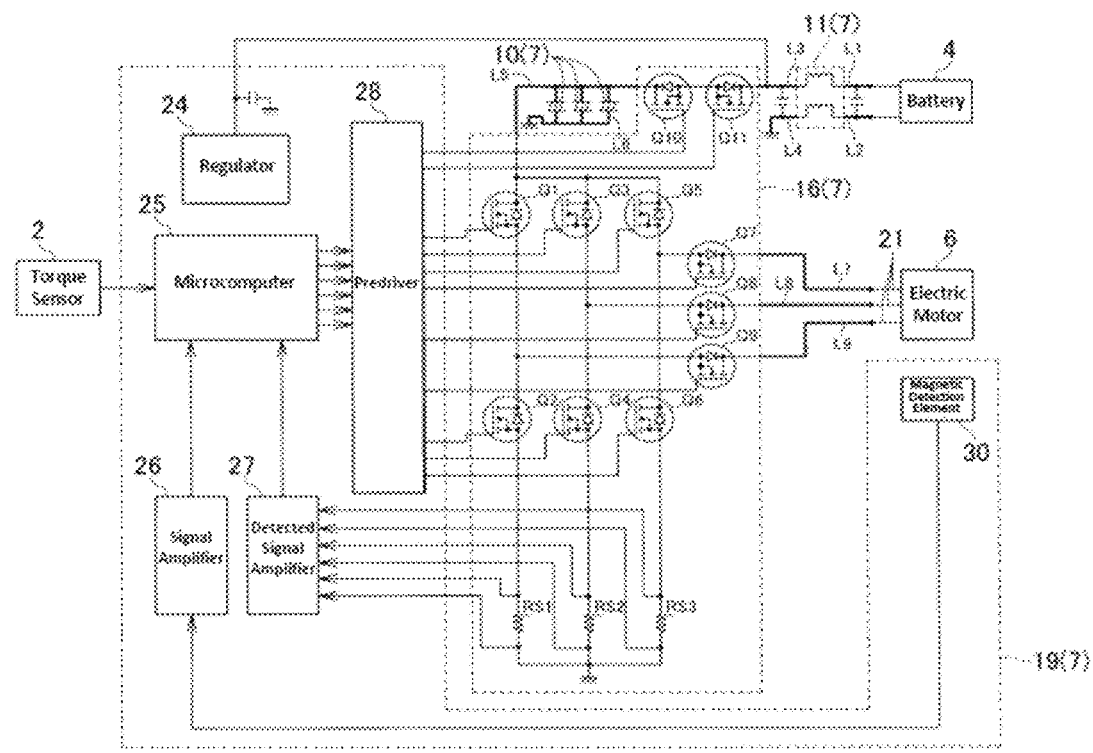
FIG. 3 is a diagram exemplifying the configuration of the electronic control unit in FIG. 1.

As shown, for instance, in FIG. 3, the electronic control unit 7 in FIG. 1 includes a regulator (power source circuit) 24, shunt resistors RS1, RS2 and RS3 that are current sensors for detecting motor current (actual current), a microcomputer 25, inverter circuits (FET bridge circuits) Q1, Q2, Q3, Q4, Q5 and Q6 that cause drive current (three-phase alternating current) to flow into the electric motor 6 (brushless motor), and the magnetic detection element 30. The electronic control unit 7 can receive not only the torque signal but also, for instance, a vehicle velocity signal. Here, the vehicle velocity signal is detected by a vehicle velocity sensor. Alternatively, the signal may be detected or calculated by another electronic control unit connected to the electronic control unit 7 via an intra-vehicle network, such as, e.g., CAN (Controller Area Network). The electronic control unit 7 in FIG. 1 or the microcomputer 25 in FIG. 3 can perform vector control for the electric motor 6 on the basis of the torque signal, the vehicle velocity signal and the like.

Such an electronic control unit 7 sets a target current on the basis of at least the steering torque (torque signal). Preferably, this unit sets the target current also in consideration of the vehicle velocity (vehicle velocity signal) detected by, e.g., the vehicle velocity sensor, and the rotation angle (rotation signal) of the rotor detected by the magnetic detection element 30. The electronic control unit 7 can control the drive current (drive signal) for the electric motor 6 such that the motor current (actual current) detected by the current sensor matches with the target current.

The electric power steering device rotates the electric motor 6 in a normal direction or a reverse direction according to the steering torque by the driver, thereby allowing a combined torque made by adding the assist torque (additional torque) of the electric motor 6 to steer the steering wheels through the rack shaft.

Figure 2:
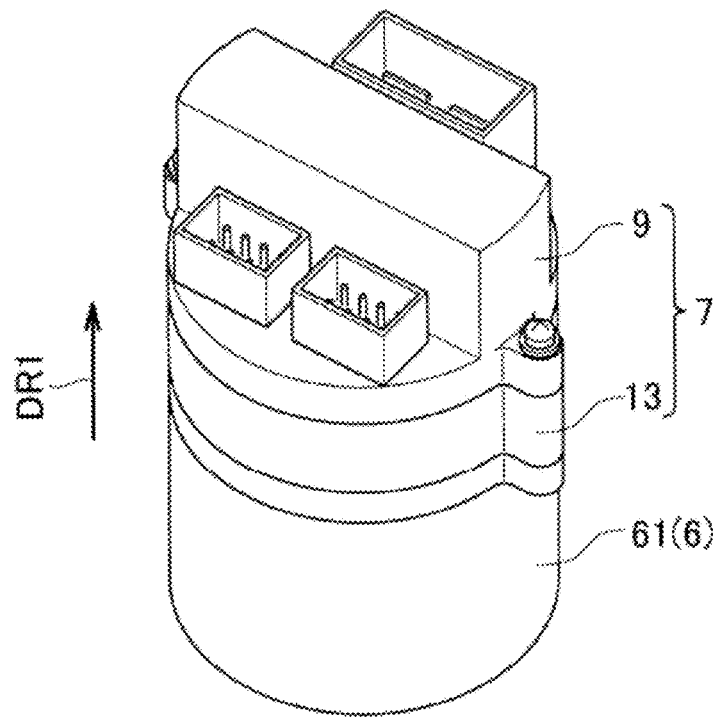
FIG. 2 is a diagram exemplifying an appearance of an electronic control unit for an electric power steering according to the present invention.
Figure 4:
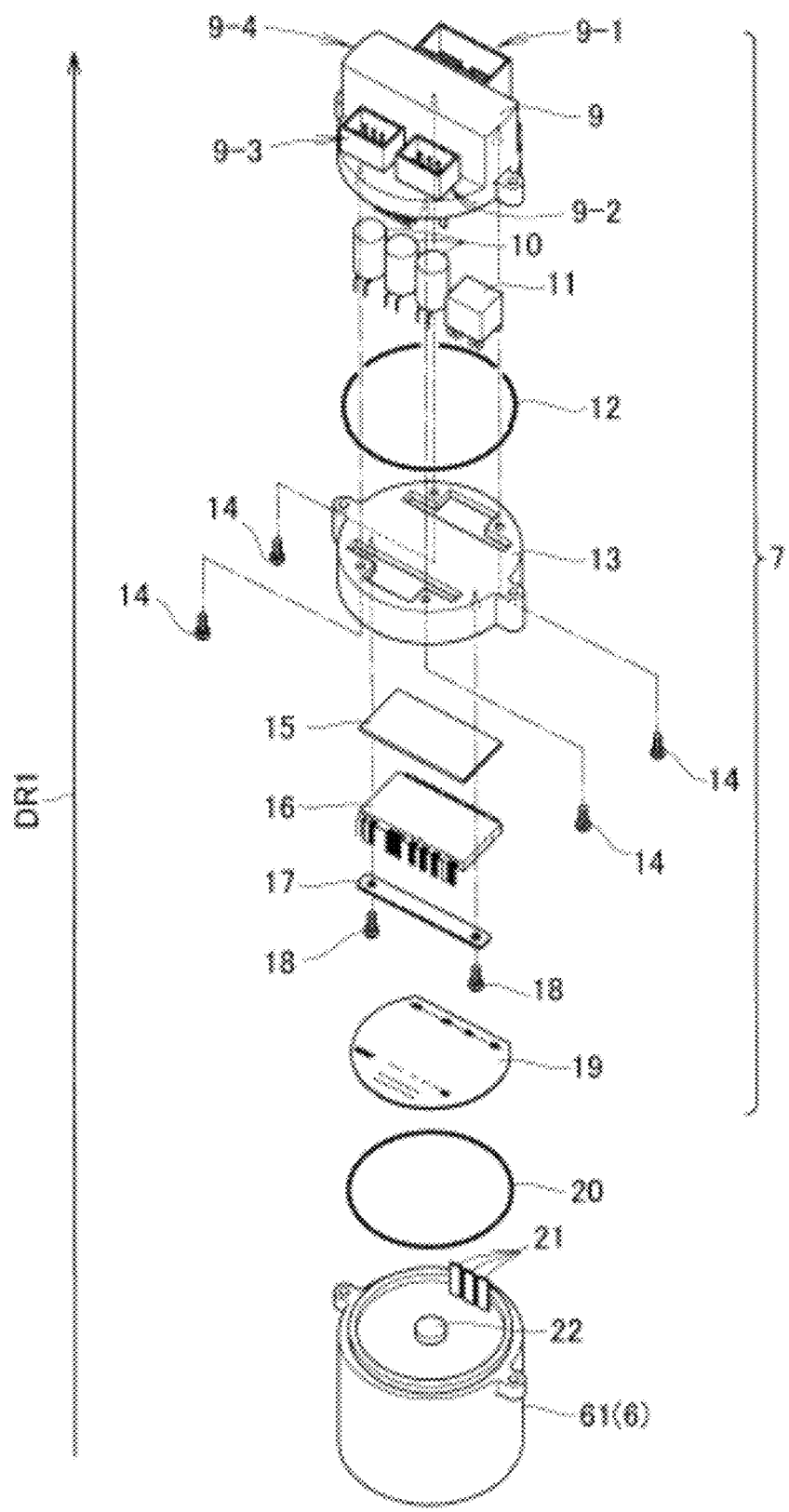
FIG. 4 is a diagram showing a first example of an exploded perspective view of the electronic control unit in FIG. 2.

FIG. 2 shows an example of an appearance of the electronic control unit for an electric power steering (the electronic control unit 7 in FIG. 1) according to the present invention. In the example in FIG. 2, a connector case 9 includes an external connector. Here, the external connector can receive the torque signal. The connector case 9 is a cover of the electronic control unit 7 in FIG. 1, and a motor case 61 in FIG. 2 is a cover of the electric motor 6 in FIG. 1. A heat sink 13 is disposed between the connector case 9 and the motor case 61 in FIG. 2. Here, the heat sink 13 is a housing or portion that is for radiating heat and fixes a power module 16 and a control board 19 and, preferably, stores or fixes the power module 16 and the control board 19 which are shown in FIG. 4.

In addition, the electronic control unit 7 is unitarily formed with the electric motor 6 or the motor case 61 so as to dispose the heat sink 13 and the connector case 9 in a direction DR1 in FIG. 2. In the case where the direction DR1 indicates, for instance, an upper side of the electric motor 6 in the example in FIG. 2, the connector case 9 is disposed upward of the heat sink 13 (and the power module 16 and the control board 19). Accordingly, a protrusion of the external connector of the connector case 9 can be suppressed, and a small electronic control unit for an electric power steering can be provided. Therefore, for instance, in the case where the electronic control unit 7 in FIG. 1 (and the electric motor 6) is disposed in parallel with the gearbox 3, the electronic control unit 7 (and the electric motor 6) is easily attached to the gearbox 3. The direction DR1 indicates the direction of a shaft (a rotating shaft) 22 in FIG. 4. The external connector of the connector case 9 in FIG. 2 includes at least one terminal that connects the torque sensor 2 and the like to the electronic control unit 7 in FIG. 1.

FIG. 3 shows an example of the configuration of the electronic control unit 7 in FIG. 1. In the example in FIG. 3, the electronic control unit 7 in FIG. 1 includes the power module 16. The power module 16 includes the inverter circuits Q1, Q2, Q3, Q4, Q5 and Q6 that generate a drive signal to be supplied to the electric motor 6. Here, the power module 16 can be configured by a molded power module as shown in FIG. 4. That is, the inverter circuits Q1, Q2, Q3, Q4, Q5 and Q6 in FIG. 3 are disposed on, for instance, a power board, not shown. The power module 16 is formed by, for instance, resin-molding the inverter circuits Q1, Q2, Q3, Q4, Q5 and Q6 and the power board.

Next, in the example in FIG. 3, the electronic control unit 7 in FIG. 1 may further include the control board 19. The control board 19 includes a control circuit that controls the inverter circuits Q1, Q2, Q3, Q4, Q5 and Q6. Here, as shown in FIG. 3, the control circuit can be configured by the microcomputer 25 and a predriver 28. More specifically, the microcomputer 25 can drive the inverter circuits Q1, Q2, Q3, Q4, Q5 and Q6 configured by, for instance, six switching elements via the predriver 28 according to the torque signal detected by the torque sensor 2, thereby allowing current to flow into the electric motor 6.

Preferably, the electronic control unit 7 or the power module 16 may further include motor relays that can break connection between the electric motor 6 and the inverter circuits Q1, Q2, Q3, Q4, Q5 and Q6. Here, the motor relays may be semiconductor relays Q7, Q8 and Q9 as shown in FIG. 3. When the inverter circuits Q1, Q2, Q3, Q4, Q5 and Q6 are sensed in an abnormal situation, the power module 16 or the semiconductor relays Q7, Q8 and Q9 can stop control of the electric motor 6. Furthermore, the motor relays are configured by the semiconductor relays Q7, Q8 and Q9. Accordingly, this configuration can provide the smaller electronic control unit 7 or the smaller power module 16.

Next, preferably, the electronic control unit 7 or the power module 16 may further include power source relays that can break a power supply from a battery 4. Here, as shown in FIG. 3, the power source relays can be configured by semiconductor relays Q10 and Q11. When the battery 4 or a power source voltage causes abnormality, the power module 16 or the semiconductor relays Q10 and Q11 can break power from the battery 4. Furthermore, the power source relays are configured by the semiconductor relays Q10 and Q11. Accordingly, this configuration can provide the smaller electronic control unit 7 or power module 16.

Next, preferably, the electronic control unit 7 or the power module 16 may further include the shunt resistors RS1, RS2 and RS3 that detect, for instance, U, V and W-phase currents flowing in U, V and W coils of the electric motor 6 during driving by the inverter circuits Q1, Q2, Q3, Q4, Q5 and Q6. Here, as shown in FIG. 3, the shunt resistors RS1, RS2 and RS3 may be disposed on low-potential sides of the inverter circuits Q1, Q2, Q3, Q4, Q5 and Q6.

The power module 16 is one component including at least the inverter circuits Q1, Q2, Q3, Q4, Q5 and Q6. The power module 16 may be configured by multiple components. As described above, the power module 16 can include not only the inverter circuits Q1, Q2, Q3, Q4, Q5 and Q6 but also at least one of the motor relay, the power source relay and the current sensor.

Next, preferably, the electronic control unit 7 and the control board 19 may further include, for instance, a detected signal amplifier 27 that amplifies the voltage drop caused when current flows in the shunt resistor RS1 (e.g., the voltage across the opposite ends of the shunt resistor RS1) and outputs the voltage to the microcomputer 25. Thus, the microcomputer 25 can more correctly detect the motor current of the electric motor 6 via the shunt resistors RS1, RS2 and RS3, and cause more appropriate motor current in the electric motor 6.

Preferably, the electronic control unit 7 or the control board 19 further includes a signal amplifier 26 that amplifies the rotation signal of the electric motor 6 detected by the magnetic detection element 30 and outputs the signal to the microcomputer 25. Thus, the microcomputer 25 can more correctly set the target current of the electric motor 6. More specifically, the control board 19 in FIG. 4 includes the magnetic detection element 30 in FIG. 3 such that, for instance, the permanent magnet is provided on a shaft 22 (see FIG. 4) on the side of the electronic control unit 7 or the side of the control board 19, and the magnetic detection element 30 is disposed adjacent to the permanent magnet. During rotation of the permanent magnet on the shaft 22, the magnetic detection element 30 in FIG. 3 can detect change in a magnetic field caused by the rotation of the permanent magnet. The microcomputer 25 can receive such an output (rotation signal) of the magnetic detection element 30, and calculate the rotation angle of the electric motor 6. The magnetic detection element 30 may be, for instance, a magnetic resistance sensor or a Hall sensor. Thus, the small electronic control unit 7 or the control board 19 can be provided.

The electronic control unit 7 or the microcomputer 25 in FIG. 3 can receive an ON/OFF signal from an ignition switch 5 which is located outside the electronic control unit 7 and the electric motor 6. When the ignition switch 5 is OFF, the magnetic detection element 30 and the signal amplifier 26 may be kept to operate and the microcomputer 25 may be kept to calculate the rotation angle of the electric motor 6. In other words, in the case where no steering angle sensor is attached to the steering handle 1 in FIG. 1, the microcomputer 25 can always calculate the steering angle on the basis of the rotation signal from the electric motor 6. Note that the electronic control unit 7 or the control board 19 may include another microcomputer that operates only when the ignition switch 5 is OFF, another magnetic detection element, and another signal amplifier. It is a matter of course that when the ignition switch 5 is OFF, the electronic control unit 7 or the control board 19 does not necessarily calculate the rotation angle of the electric motor 6.

FIG. 4 shows one example of an exploded perspective view of the electronic control unit 7 in FIG. 2. In the example in FIG. 4, the electronic control unit 7 for an electric power steering includes the connector case 9, the heat sink 13, the power module 16 and the control board 19. The electronic control unit 7 may further include, for instance, three electrolytic capacitors 10 that smooth the power source voltage that is a source of the drive signal. Here, the number of electrolytic capacitors 10 may be one or more. The electronic control unit 7 may further include a noise filter. Here, the noise filter may be, for instance, a common mode coil 11 that includes two coils (see FIG. 3). The connector case 9 in FIG. 4 may include a unit cover 9-4 that stores the electrolytic capacitors 10 and the noise filter 11. As described later, the electrolytic capacitors 10 and the common mode coil 11 are electrically connected to a power source terminal or energizing path of the connector case 9 by, for instance, welding, soldering, an adhesive.

The noise filter (first noise filter) may include the common mode coil 11 and, for instance, two capacitors (see FIG. 3). Alternatively, the noise filter (first noise filter) may only include, for instance, two capacitors. Accordingly, the connector case 9 or the unit cover 9-4 in FIG. 4 may store not only the electrolytic capacitors 10 but also, for instance, the common mode coil 11 and two capacitors, which are as the noise filter (first noise filter). In addition, the noise filter may include, for instance, not only the common mode coil 11 and the two capacitors (first noise filter) but also e.g., one capacitor (second noise filter) disposed on e.g., the control board 19 (see FIG. 3).

Referring to FIG. 4 showing the electronic control unit 7 and the motor case 61, the connector case 9, the heat sink 13, the power module 16 and the control board 19 are disposed in the direction (direction DR1) of the shaft 22 of the electric motor 6 in an order of the control board 19, the power module 16, the heat sink 13 and the connector case 9. Thus, the electronic control unit 7 is formed unitarily with the electric motor 6 on, for instance, the upper side of the electric motor 6.

Figure 5:
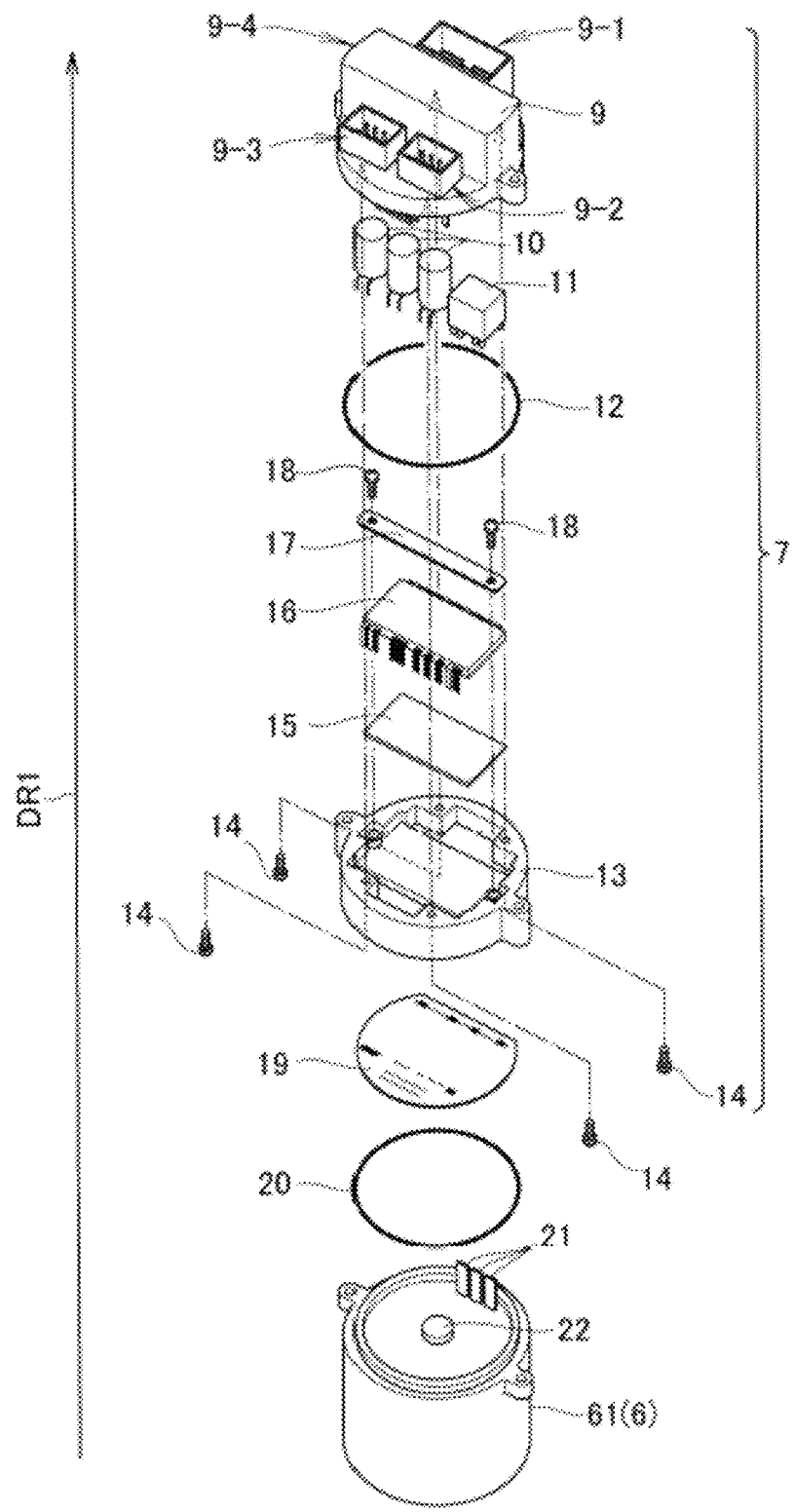
FIG. 5 is a diagram showing a second example of an exploded perspective view of the electronic control unit in FIG. 2.

Referring to FIG. 5 showing the electronic control unit 7 and the motor case 61, the connector case 9, the heat sink 13, the power module 16 and the control board 19 are disposed in the direction (direction DR1) of the shaft 22 of the electric motor 6 in the order of the control board 19, the heat sink 13, the power module 16 and the connector case 9. Thus, the electronic control unit 7 is formed unitarily with the electric motor 6, for instance, on the upper side of the electric motor 6.

More specifically, the power module 16, the control board 19 and the heat sink 13 are disposed in the order of the control board 19, the heat sink 13 and the power module 16. Thus, the control board 19 can be apart from the power module 16 or the inverter circuits Q1, Q2, Q3, Q4, Q5 and Q6, thereby allowing heat generated on, for instance, the upper side of the heat sink 13 or the power module 16 to be reduced. Accordingly, heat generated in the inverter circuits Q1, Q2, Q3, Q4, Q5 and Q6 is easily transferred onto, for instance, the top surface of the heat sink 13, thereby allowing the electronic control unit 7 to have high heat radiation efficiency. In addition, heat generated in the control board 19 is easily transferred to, for instance, the rear surface of the heat sink 13, thereby allowing the electronic control unit 7 to have further high heat radiation efficiency.

Figure 12:
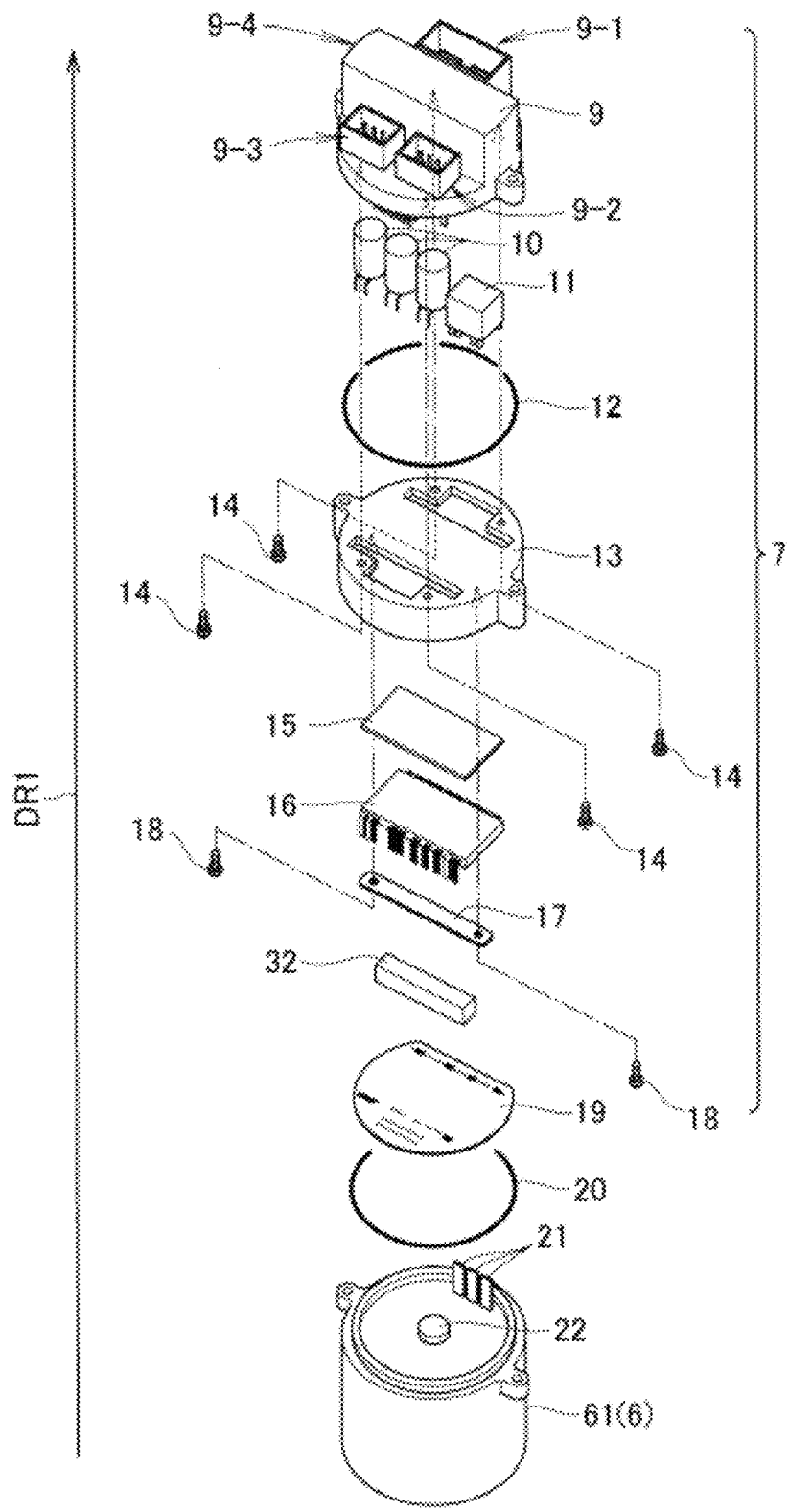
FIG. 12 is a diagram showing a fifth example of an exploded perspective view of the electronic control unit in FIG. 2.
Figure 13A:
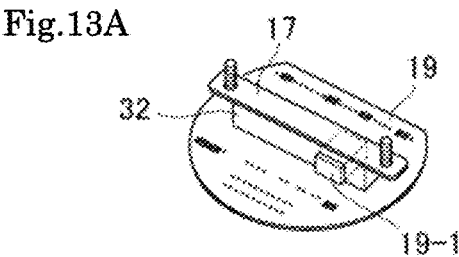
FIGS. 13A and 13B show diagrams illustrating an arrangement of a radiator plate, a heat conductive member and a control board in FIG. 12, FIGS. 13C and 13D show a variation of the radiator plate in FIGS. 13A and 13B, and FIGS. 13E and 13F show diagrams illustrating another variation of the radiator plate in FIGS. 13A and 13B.
Figure 13B:
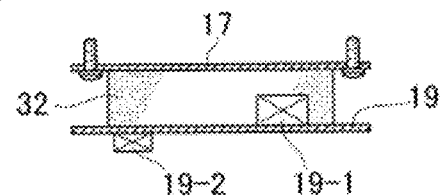

As described later, the heat generated in the control board 19 in FIG. 12 is transferred to a heat conductive member 32 (see FIG. 13B). Next, the heat is transferred to the heat sink 13 via the radiator plate 17 (see FIG. 13D). Here, the control board 19 does not include the heat conductive member 32. In other words, on the main body (substrate itself) of the control board 19, only heat generating components 19-1 and 19-2 in FIGS. 13A and 13B are disposed. Accordingly, the flexibility of designing the control board 19 is improved. Therefore, the electronic control unit 7 having a high designing flexibility can be provided.

Figure 6:
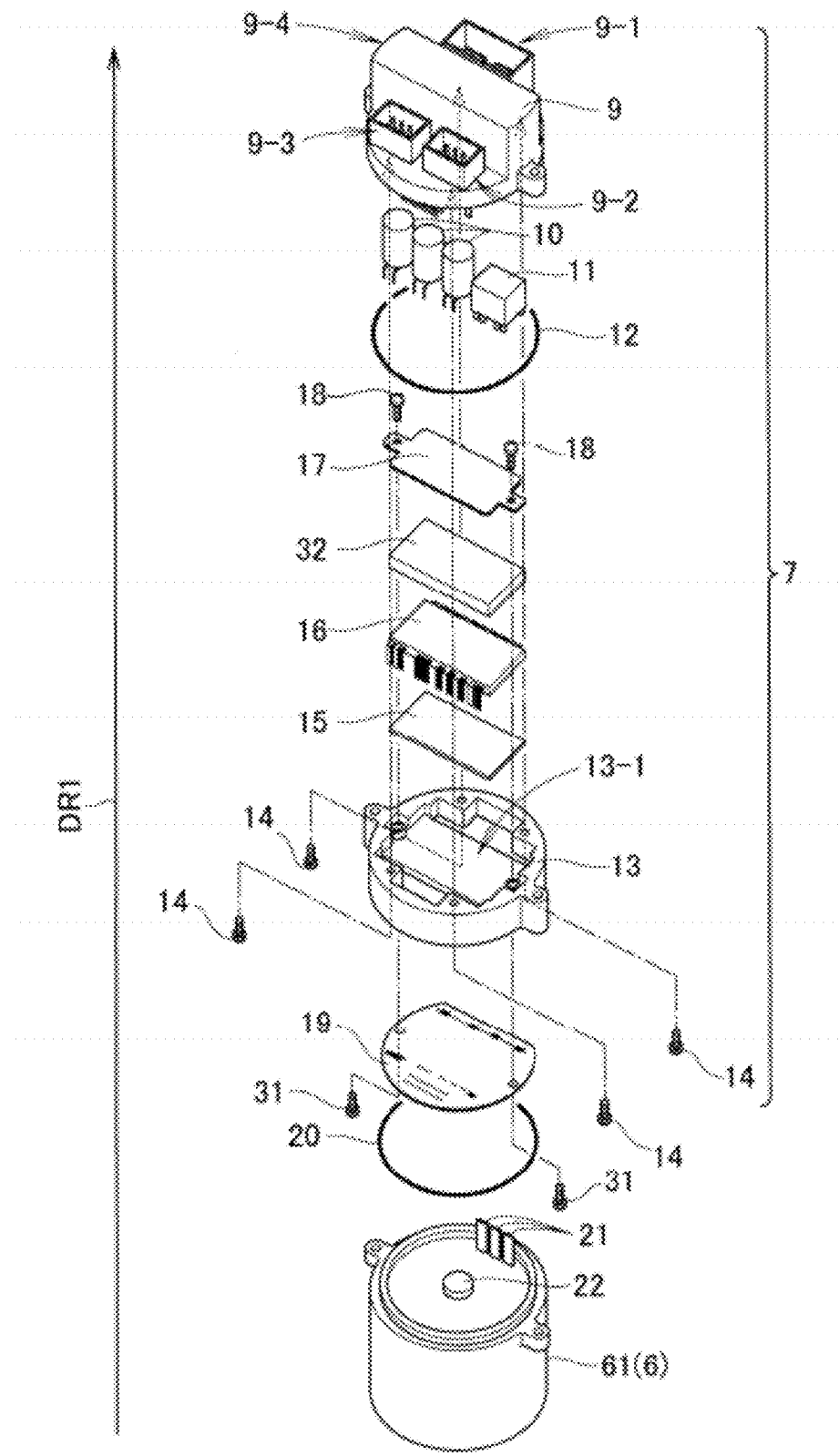
FIG. 6 is a diagram showing a third example of an exploded perspective view of the electronic control unit in FIG. 2.

In the configuration in FIG. 6, particularly, the power module 16, the control board 19 and the heat sink 13 are disposed in the order of the control board 19, the heat sink 13 and the power module 16. Thus, the control board 19 can be apart from the power module 16 or the inverter circuits Q1, Q2, Q3, Q4, Q5 and Q6, thereby allowing heat generated, for instance, on the upper side of the heat sink 13 or in the power module 16 to be reduced. Accordingly, heat generated in the inverter circuits Q1, Q2, Q3, Q4, Q5 and Q6 is easily transferred onto, for instance, the top surface of the heat sink 13, thereby allowing the electronic control unit 7 to have a high heat radiation efficiency. In addition, heat generated in the control board 19 is easily transferred onto, for instance, the rear surface of the heat sink 13, thereby allowing the electronic control unit 7 to have a further high heat radiation efficiency.

Referring back to FIG. 4, the connector case 9 provided with the external connector that includes a connector 9-3 for receiving the torque signal and a connector 9-1 for receiving a power source voltage and current is disposed, for instance, upward of the heat sink 13, the power module 16 and the control board 19. Thus, the protrusion of the connectors 9-1 and 9-3 can be suppressed, thereby allowing the small electronic control unit 7 to be provided. In addition, it is preferred that the connector case 9 further include a connector 9-2 for receiving the ON/OFF signal from the ignition switch 5 in FIG. 1, thereby suppressing the protrusion of the connector 9-2. Accordingly, in the case where such an electronic control unit 7 is disposed in parallel with the gearbox 3 in FIG. 1, the electronic control unit 7 can be easily attached to the gearbox 3.

In a state where the electrolytic capacitors 10 and the coil 11 in FIG. 4 are inserted into the connector case 9, the connector case 9 can be attached to the heat sink 13. Here, preferably, for instance, an O-ring 12 is inserted between the connector case 9 and the heat sink 13. Thus, such a waterproof electronic control unit 7 can be configured. It is a matter of course, for instance, an adhesive may be used instead of the O-ring 12. Next, the connector case 9 can be fixed to the heat sink 13 through, for instance, four male screws 14, 14, 14 and 14. Here, the number of male screws 14, 14, 14 and 14 may be one or more. At least one of the male screws 14 may be another fixation member.

Next, the power module 16 is attached to the heat sink 13. Here, preferably, a heat conductive member 15 is inserted between the heat sink 13 and the power module 16. In addition, it is preferred that the surface of the power module 16 be in close contact with the heat sink 13 via the radiator plate 17. Accordingly, heat generated in the heat generating components (inverter circuits Q1, Q2, Q3, Q4, Q5 and Q6) of the power module 16 is easily transferred to the heat sink 13, thereby allowing the electronic control unit 7 to have further high heat radiation efficiency. In the example in FIG. 4, the power module 16 can be fixed to the heat sink 13 via, for instance, two male screws 18 and 18. Here, the number of male screws 18 and 18 may be one or three or more. At least one male screw 18 may be another fixation member.

In the example in FIG. 4, the two male screws 18 and 18 fix the power module 16 and the heat conductive member 15 to the heat sink 13 together with the radiator plate 17. Accordingly, the radiator plate 17 is in close contact with the rear surface of the power module 16. The heat sink 13 and the radiator plate 17 are disposed on the front and rear surfaces or upward and downward of the power module 16. Accordingly, heat generated in the power module 16 is easily transferred to the heat sink 13 and the radiator plate 17, thereby allowing the electronic control unit 7 to have further high heat radiation efficiency. Here, the radiator plate 17 is, for instance, a metal plate. It is a matter of course that, instead of the radiator plate 17, a fixation member that does not have a heat radiation function may be used. Alternatively, instead of the radiator plate 17, the power module 16 may have screw holes (through-holes). However, reduction in size of the power module 16 increases heat generated in the power module 16. Accordingly, it is preferred that a heat radiation member be arranged not only on the front surface side (power board) of the power module 16 but also on the rear surface side (resin and/or inverter circuits Q1, Q2, Q3, Q4, Q5 and Q6) of the power module 16.

Meanwhile, in FIG. 12, the control board 19 is fixed toward the power module 16 such that the heat conductive member 32 is disposed between the radiator plate 17 and the control board 19. Here, the control board 19 may be fixed to, the heat sink 13 via, for instance, male screws (not shown). Alternatively, the control board 19 can be fixed to, for instance, nails (not shown) of the connector case 9. The heat conductive member 32 may be preliminarily fixed to, for instance, the radiator plate 17 with an adhesive or the like. Alternatively, the heat conductive member 32 may be preliminarily disposed on the radiator plate 17, and fixed by insertion between the radiator plate 17 and the control board 19.

In addition, the terminals (legs) of the power module 16 and the terminals of the connector case 9 (power source terminal, signal terminal (e.g., press-fit terminals)) are electrically connected to, for instance, an energizing path, such as wiring, of the control board 19 by soldering or the like via, e.g., through-holes of the control board 19. After the control board 19 is fixed toward the power module 16, a high-potential power source line and/or a low-potential power source line (the power source terminal of the connector case 9) that defines the power source voltage (the difference between the potential of the positive pole and the negative pole (GND) of the battery 4) is electrically connected to a part of the energizing path (e.g., bus bar) of the control board 19 connected to the high-potential power source line and/or the low-potential power source line by, for instance, welding. Likewise, an output terminal that is an energizing path connected to the electric motor 6 via the power module 16 is electrically connected to a part of the terminals (legs) of the power module 16 connected to the output terminal by, for instance, welding.

Meanwhile, in FIG. 6, it is preferred that the heat conductive member 32 be inserted between the power module 16 and the radiator plate 17. The heat conductive member 32 facilitates heat generated in the power module 16, which is a power unit, to be transferred to the radiator plate 17. In particular, in the case of the molded power module 16, the front and rear surfaces thereof are flat. Accordingly, the power module 16 is easily brought into a close contact with the heat sink 13 and the radiator plate 17. The heat conductive members 15 and 32 may be, for instance, grease, a heat-radiation sheet or the like. The power module 16 is further easily brought into contact with the heat sink 13 and the radiator plate 17 via the heat conductive members 15 and 32. It is a matter of course that the power unit may be configured by a power board (non-mold type) made of a metal substrate instead of the power module 16. Next, the connector case 9 can be fixed to the heat sink 13 (and the power module 16) via the, for instance, the four male screws 14, 14, 14 and 14. Here, the number of male screws 14, 14, 14 and 14 may be one or more. At least one of the male screws 14 may be another fixation member.

Figure 7:
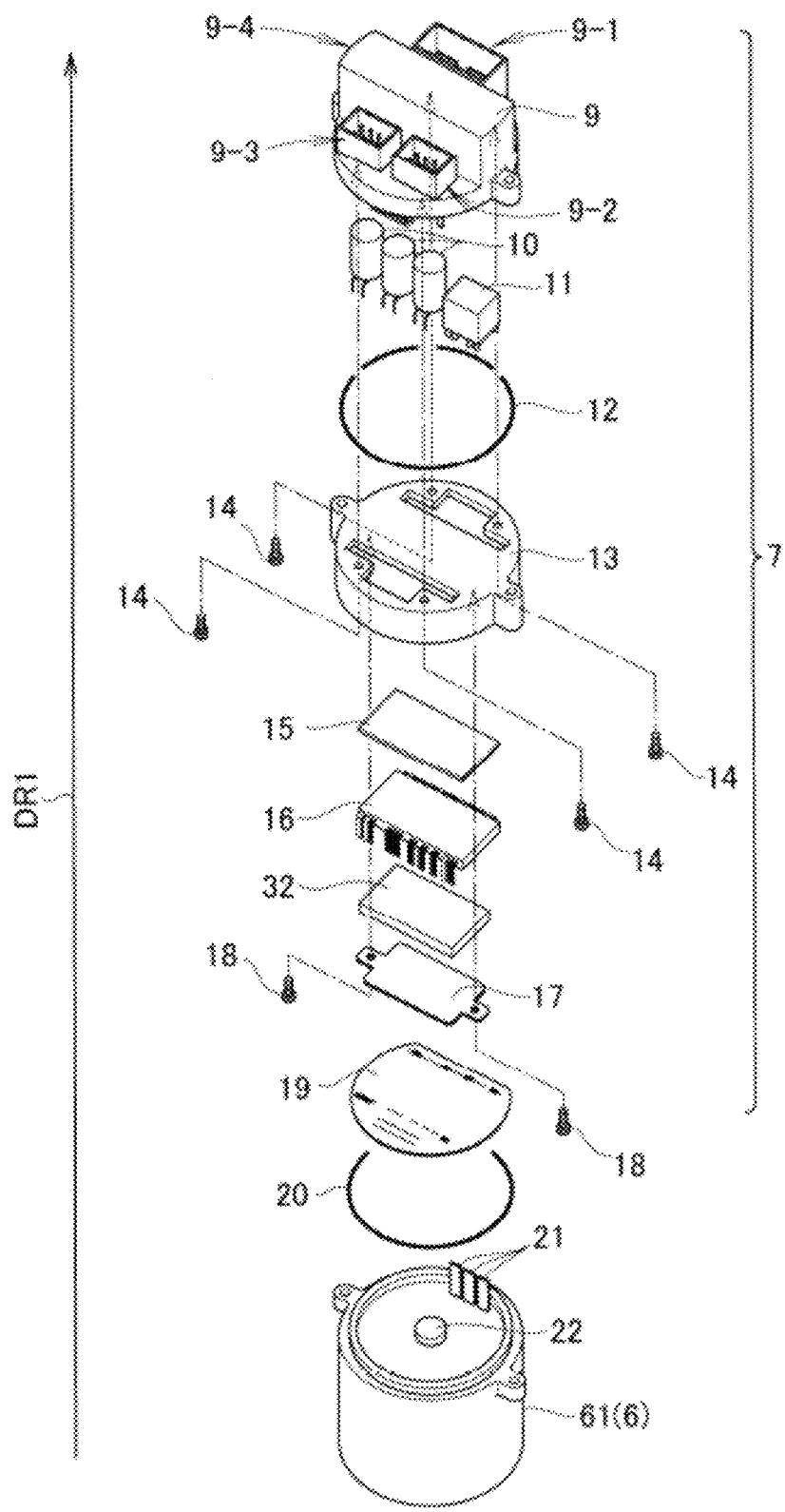
FIG. 7 is a diagram showing a fourth example of an exploded perspective view of the electronic control unit in FIG. 2.

FIG. 7 shows another example of an exploded perspective view of the electronic control unit 7 in FIG. 2. Wherein, in the configuration in FIG. 7, particularly, the power module 16, the control board 19 and the heat sink 13 are disposed in the direction (direction DR1) of the shaft 22 of the electric motor 6 in the order of the control board 19, the power module 16 and the heat sink 13. As shown in FIG. 7, the power module 16, the radiator plate 17, and the heat conductive members 15 and 32 may be disposed between the heat sink 13 and the control board 19.

Referring back to FIG. 4, the electronic control unit 7 can be attached to the electric motor 6. Here, preferably, for instance, an O-ring 20 is inserted between the electronic control unit 7 (heat sink 13) and the electric motor 6 or the motor case 61. Thus, a waterproof electronic control unit 7 can be configured. It is a matter of course that, instead of the O-ring 20, e.g., an adhesive may be used. In a state where the electronic control unit 7 is attached to the electric motor 6, output terminals L7, L8 and L9 are electrically connected to the three-phase line 21 of the electric motor 6 by, for instance, insertion. Finally, holes provided at an external edge of the connector case 9 and holes provided at an external edge of the heat sink 13 are fixed to holes provided at an external edge of the motor case 61 through, for instance, two male screws (see FIG. 2). Here, the electronic control unit may be formed unitarily with the electric motor 6 or the motor case 61 through another fixation member.

Figure 8A:
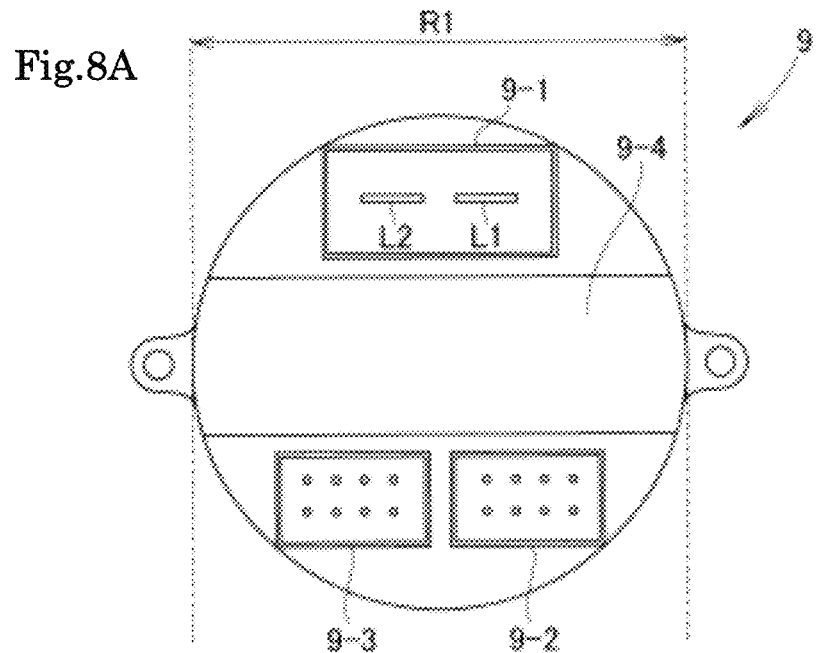
FIG. 8A is a plan view of the electronic control unit in FIG. 2.
Figure 8B:
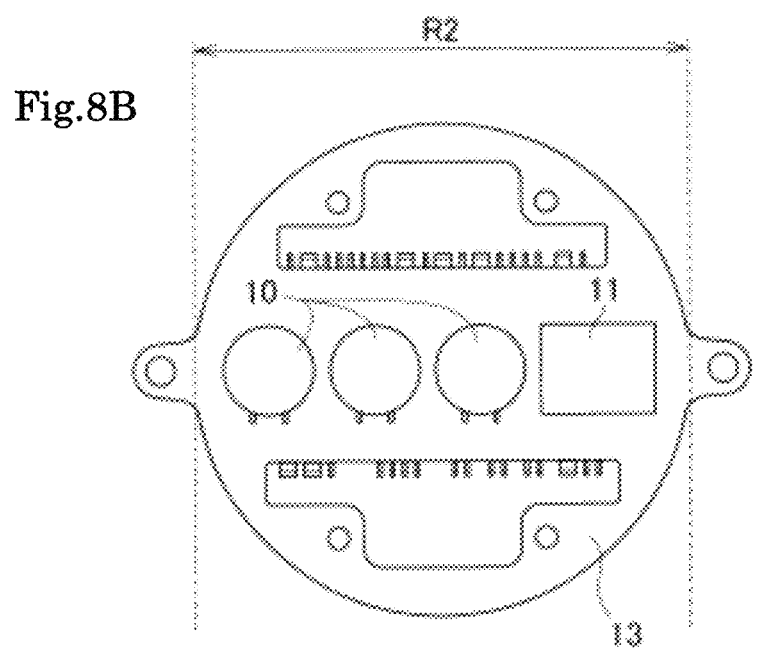
FIG. 8B is a plan view of the electronic control unit in FIG. 2 (excluding a connector case)

FIG. 8A shows a plan view of the electronic control unit 7 in FIG. 2. FIG. 8B shows a plan view of the electronic control unit 7 (excluding the connector case 9) in FIG. 2. As shown in FIGS. 8A and 8B, the connector case 9 has an external shape in a plan view identical to the external shape of the heat sink 13. The external shape of the connector case 9 may be smaller than the external shape of the heat sink 13. In FIG. 8A, the external shape of the connector case 9 has a circular shape defined by a diameter R1, except for holes or convex portions provided at the external edge. In FIG. 8B, the external shape of the heat sink 13 indicates a circular shape defined by a diameter R2 identical to the diameter R1, except for holes or convex portions provided at the external edge.

In the example in FIG. 8A, the connector 9-1 for receiving the power source voltage includes power source terminals L1 and L2 (see FIG. 3) for forming the high-potential power source line and the low-potential power source line. The connector 9-3 for receiving the torque signal and the connector 9-2 for receiving the ON/OFF signal include signal terminals.

Figure 9A:
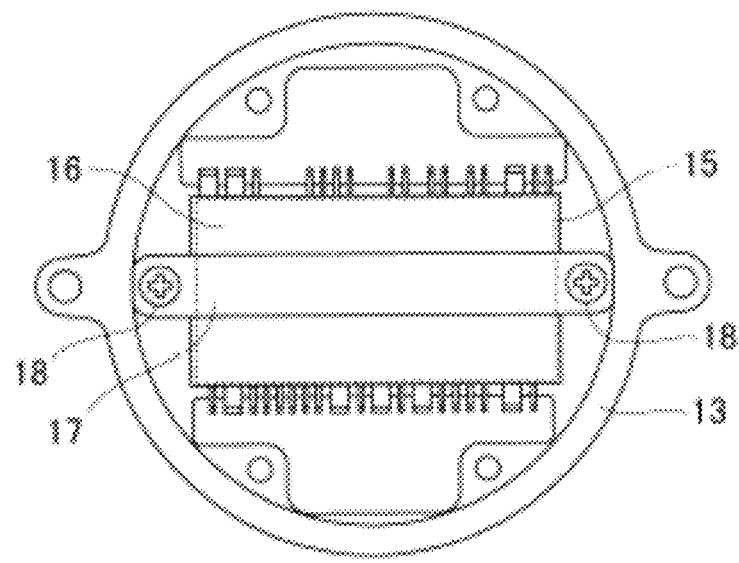
FIG. 9A is a plan view (rear surface) of a heat sink (including a power module) in FIG. 2.
Figure 9B:
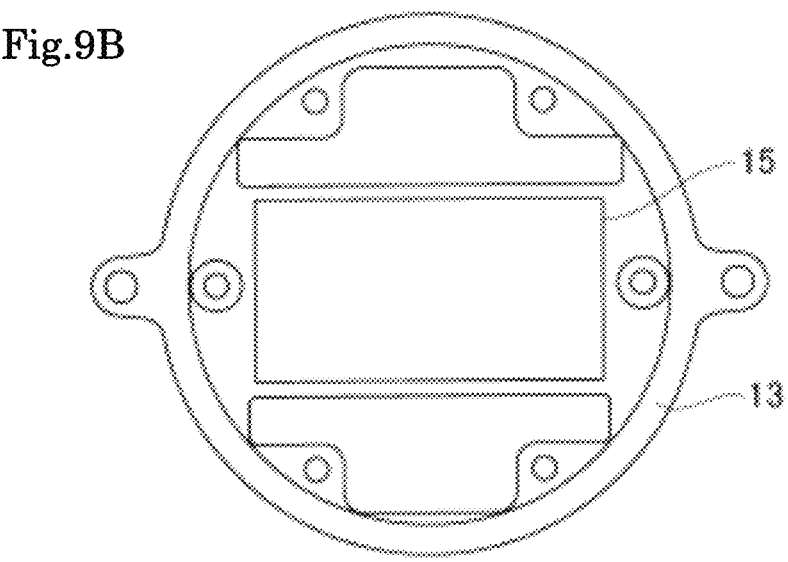
FIG. 9B is a plan view (rear surface) of the heat sink (excluding the power module) in FIG. 2.

FIG. 9A shows a plan view (rear surface) of the heat sink 13 (including the power module 16) in FIG. 2. FIG. 9B shows a plan view (rear surface) of the heat sink 13 (excluding the power module 16) in FIG. 2. As shown in FIGS. 9A and 9B, the two male screws 18 and 18 can fix the power module 16 and the heat conductive member 15, together with the radiator plate 17, to the heat sink 13. Here, the heat conductive member 15 is disposed between the heat sink 13 and the power module 16, and covers or cases the most part of the surface of the power module 16 or is in close contact with the most part of the surface of the power module 16.

Figure 10A:
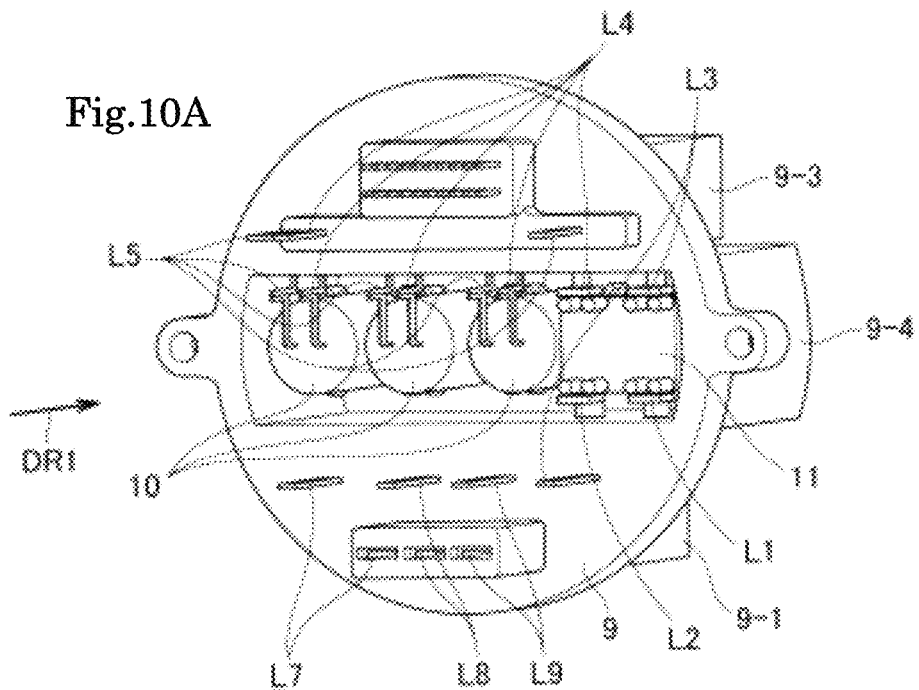
FIG. 10A is a diagram exemplifying an appearance showing a rear surface of a connector case (including electrolytic capacitors and a common mode coil) in FIG. 2.
Figure 10B:
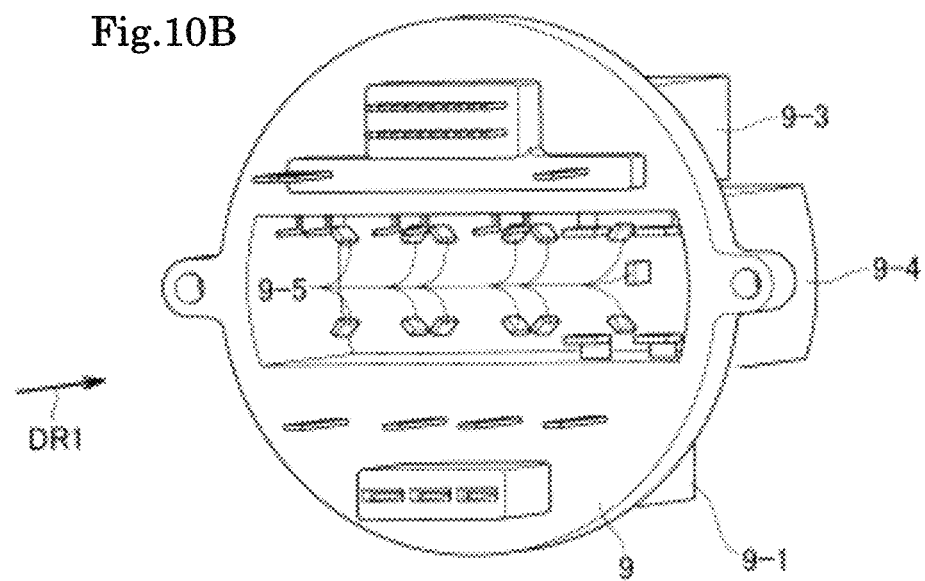
FIG. 10B is a diagram exemplifying an appearance showing a rear surface of the connector case (excluding the electrolytic capacitors and common mode coil) in FIG. 2.

FIG. 10A shows an example of an appearance illustrating the rear surface of the connector case 9 (including the electrolytic capacitors 10 and common mode coil 11) in FIG. 2. FIG. 10B shows an example of an appearance of the rear surface of the connector case 9 (excluding the electrolytic capacitors 10 and common mode coil 11) in FIG. 2. As shown in FIGS. 10A and 10B, the unit cover 9-4 of the connector case 9 can store the electrolytic capacitors 10, 10 and 10 and the common mode coil 11. The unit cover 9-4 or a concave portion of the connector case 9 is provided with multiple nails 9-5. These nails 9-5 can guide insertion of the electrolytic capacitors 10 and the common mode coil 11. In a state where the electrolytic capacitors 10 and the common mode coil 11 are completely inserted into the unit cover 9-4 or the concave portion, the common mode coil 11 and the electrolytic capacitors 10 are electrically connected or fixed to the power source terminals L1 and L2 and energizing paths L3, L4 (L6) and L5 (see FIG. 3) of the connector case 9 by, for instance, welding, soldering, an adhesive or the like.

The electrolytic capacitors 10 and common mode coil 11 can thus be arranged close to the connector case 9. In other words, the electrolytic capacitors 10 and the common mode coil 11 are supplied with the power source voltage (the high-potential power source line and low-potential power source line) without intervention of a dedicated board. Accordingly, increase in the number of components configuring the electronic control unit 7 can be suppressed. Therefore, the small electronic control unit 7 or the electronic control unit 7 with reduced manufacturing cost can be provided. In addition, the electrolytic capacitors 10 and the common mode coil 11 can be apart from the power module 16 or the inverter circuits Q1, Q2, Q3, Q4, Q5 and Q6, thereby allowing the heat generated in the power module 16 to be reduced. Accordingly, the heat generated by the inverter circuits or the power module 16 is easily transferred to the heat sink 13, thereby allowing the electronic control unit 7 to have a high heat radiation efficiency.

Referring to FIG. 10A, the connector case 9 includes not only the power source terminals L1 and L2 and the signal terminal (e.g., press-fit terminal), but also the energizing paths L3, L4 (L6) and L5 for supplying the power source voltage to the inverter circuits Q1, Q2, Q3, Q4, Q5 and Q6, and the energizing paths (output terminals L7, L8 and L9) for supplying the drive signal to the electric motor 6. Not only the connector 9-1 including the power source terminals L1 and L2 and the connector 9-3 including the signal terminal (e.g., torque signal) but also the energizing paths L3, L4 (L6) and L5 and the output terminals L7, L8 and L9 are formed unitarily, which thus forms the connector case 9. When the energizing paths L5 and L6 are fixed to the connector case 9, the inverter circuits Q1, Q2, Q3, Q4, Q5 and Q6 or the power module 16 are easily connected to the energizing paths L1, L2, L3 and L4 and the power source terminals L1 and L2 or the connector 9-1. When the output terminals L7, L8 and L9 are fixed to the connector case 9, the inverter circuits Q1, Q2, Q3, Q4, Q5 and Q6 or the power module 16 are easily connected to the three-phase line 21 or the electric motor 6.

Figure 11A:
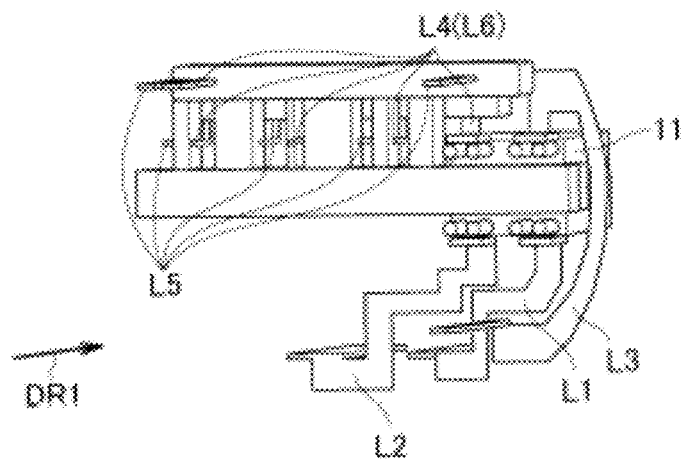
FIGS. 11A, 11B, 11C and 11D show diagrams illustrating an arrangement of bus bars in a variation of the connector case shown in FIG. 10A.
Figure 11B:
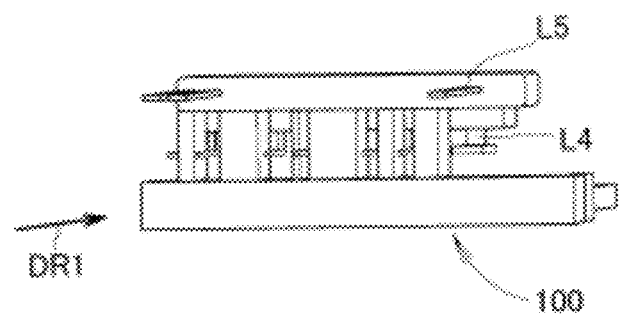
Figure 11C:
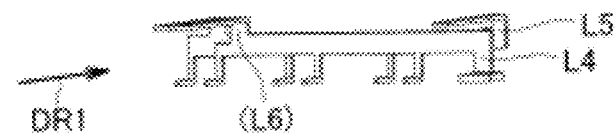
Figure 11D:
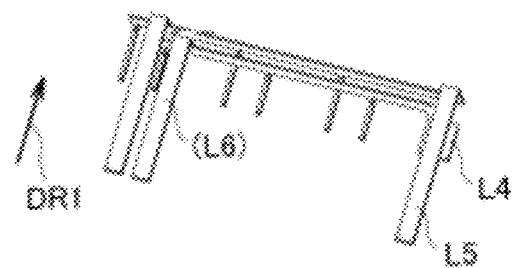

Each of FIGS. 11A, 11B, 11C and 11D is a diagram illustrating an arrangement of bus bars in a variation of the connector case 9 shown in FIG. 10A. In the example in FIG. 10A, the energizing paths L4 (L6) and L5, the power source terminals L1 and L2 and the like are unitarily formed. Alternatively, the energizing paths L4 (L6) and L5 may be independent from the connector case 9. More specifically, as shown in FIGS. 11B and 11D, the energizing paths L4 (L6) and L5, which are busbars, are molded with, for instance, resin 100. The energizing paths L4, (L6) and L5 or the bus bars are members directly connected to the electrolytic capacitors 10 and the common mode coil 11. Accordingly, the energizing paths L4 (L6) and L5 and the resin 100, which form such other members, are easily connected to large components, such as the electrolytic capacitors 10 and the common mode coil 11. In other words, in a state where the electrolytic capacitors 10 and the common mode coil 11 are fixed to the other members (energizing paths L4 (L6) and L5 and resin 100), the other members are inserted into the unit cover 9-4. Thus, in the variation of the connector case 9, the unit cover 9-4 can store not only the electrolytic capacitors 10 and the common mode coil 11 but also the energizing paths L4 (L6) and L5 and the resin 100.

Figure 13C:
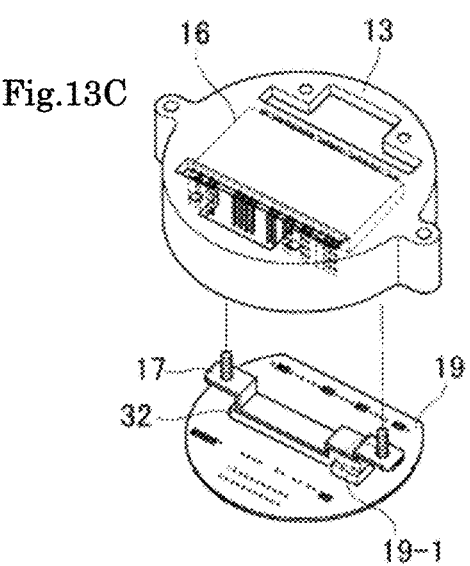
Figure 13D:
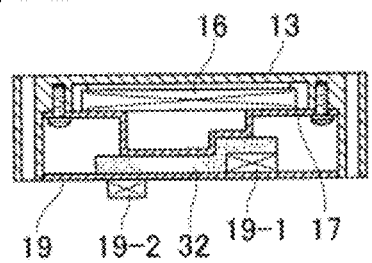
Figure 13E:
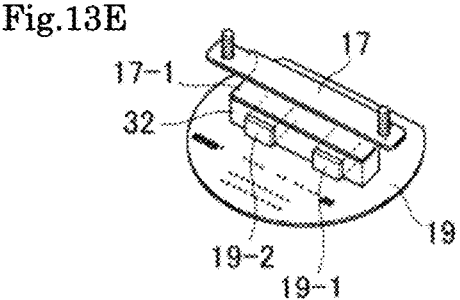
Figure 13F:
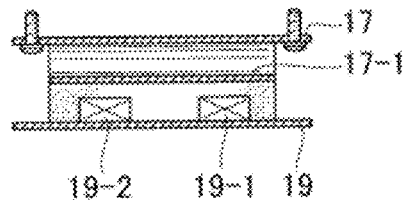

In each of FIGS. 13A and 13B, a diagram illustrating an arrangement of the radiator plate 17, the heat conductive member 32 and the control board 19 in FIG. 12. Wherein, in the configuration in FIG. 12, particularly, the power module 16, the control board 19 and the heat sink 13 are disposed in the direction (direction DR1) of the shaft 22 of the electric motor 6 in the order of the control board 19, the power module 16 and the heat sink 13. FIGS. 13C and 13D show a variation of the radiator plate 17 in FIGS. 13A and 13B, respectively. FIGS. 13E and 13F show another variation of the radiator plate 17 in FIGS. 13A and 13B, respectively. The control board 19 includes multiple components as shown in FIG. 3. All or some of the components can be arranged on, for instance, the surface (on the side of the power module 16) of the control board 19. In the example in FIG. 13B, for instance, a heat generating component 19-1 is disposed on the surface of the control board 19, while a heat generating component 19-2 is disposed on the rear surface of the control board 19. The heat generating components 19-1 and 19-2 on the control board 19 include the microcomputer 25, the regulator 24, the predriver 28 and the like in FIG. 3. In other words, in the example in FIG. 13B, the two heat generating components 19-1 and 19-2 are shown. Alternatively, the number of heat generating components in close contact with the heat conductive member 32 may be one or three or more.

As shown in FIGS. 13A and 13B, the radiator plate 17 may have, for instance, a linear shape. The heat conductive member 32 is disposed between the radiator plate 17 and the control board 19. Here, the heat conductive member 32 may preliminarily have a concave portion so as to guide, for instance, the heat generating component 19-1 or the control board 19 to be attached. Alternatively, the heat conductive member 32 may be an elastic member that includes no concave portion and has, for instance, a rectangular parallelepiped. Referring to FIG. 13B, the heat conductive member 32 is in close contact directly with the heat generating component 19-1, and indirectly with the heat generating component 19-2. When the heat conductive member 32 is in close contact indirectly with the heat generating component 19-2, the heat conductive member 32 is in close contact directly with the main body (substrate itself) of the control board 19. Thus, in conformity with the positions of the heat generating components 19-1 and 19-2 on the control board 19, the heat conductive member 32 can be disposed.

As shown in FIGS. 13C and 13D, the radiator plate 17 may have convex portions (steps) toward the heat generating components 19-1 and 19-2 such that the radiator plate 17 approaches the heat generating components 19-1 and 19-2 on the control board 19. Even in situations where the length between the power module 16 or the heat sink 13 and the control board 19 is long, heat generated by the control board 19 is easily transferred to the heat conductive member 32. Two male screws can fix the power module 16 (and the heat conductive member 15), together with the radiator plate 17, to the heat sink 13. Here, the heat conductive member 15 in FIG. 12 is disposed between the heat sink 13 and the power module 16, and covers or cases the most part of the surface of the power module 16 or is in close contact with the most part of the surface of the power module 16.

As shown in FIGS. 13E and 13F, the radiator plate 17 may include a first close contact portion (front surface) that is in close contact with the power module 16, a second close contact portion (rear surface) 17-1 that is in close contact with the heat conductive member 32, and a bent portion between the first close contact portion and the second close contact portion such that the radiator plate 17 approaches the heat generating components 19-1 and 19-2 on the control board 19. Even in the situations where the length between the power module 16 or the heat sink 13 and the control board 19 is long, heat generated by the control board 19 is easily transferred to the heat conductive member 32. In addition, in the example in FIG. 13F, the heat generating components 19-1 and 19-2 are disposed, for instance, on the surface of the control board 19. Thus, in the case where many heat generating components 19-1 and 19-2 are disposed on, for instance, the surface of the control board 19, the area of the second close contact portion (rear surface) 17-1 in close contact with the heat conductive member 32 may be designed larger than the area of the first close contact portion (surface) in close contact with the power module 16.

As shown in FIGS. 13A to 13F, in the case where the control board 19 includes the multiple heat generating components 19-1 and 19-2, the heat conductive member 32 can be in close contact with some heat generating components (at least two heat generating components) in an integral manner. Alternatively, the heat conductive member 32 may be multiple heat conductive members, and these heat conductive members can be in close contact individually with the control board. That is, for instance, the heat conductive member 32 in FIG. 13B may be divided into, for instance, two. One of the two may be in close contact with, for instance, the heat generating component 19-1, or the other of the two may be in close contact with, for instance, the heat generating component 19-2.

Figure 14:
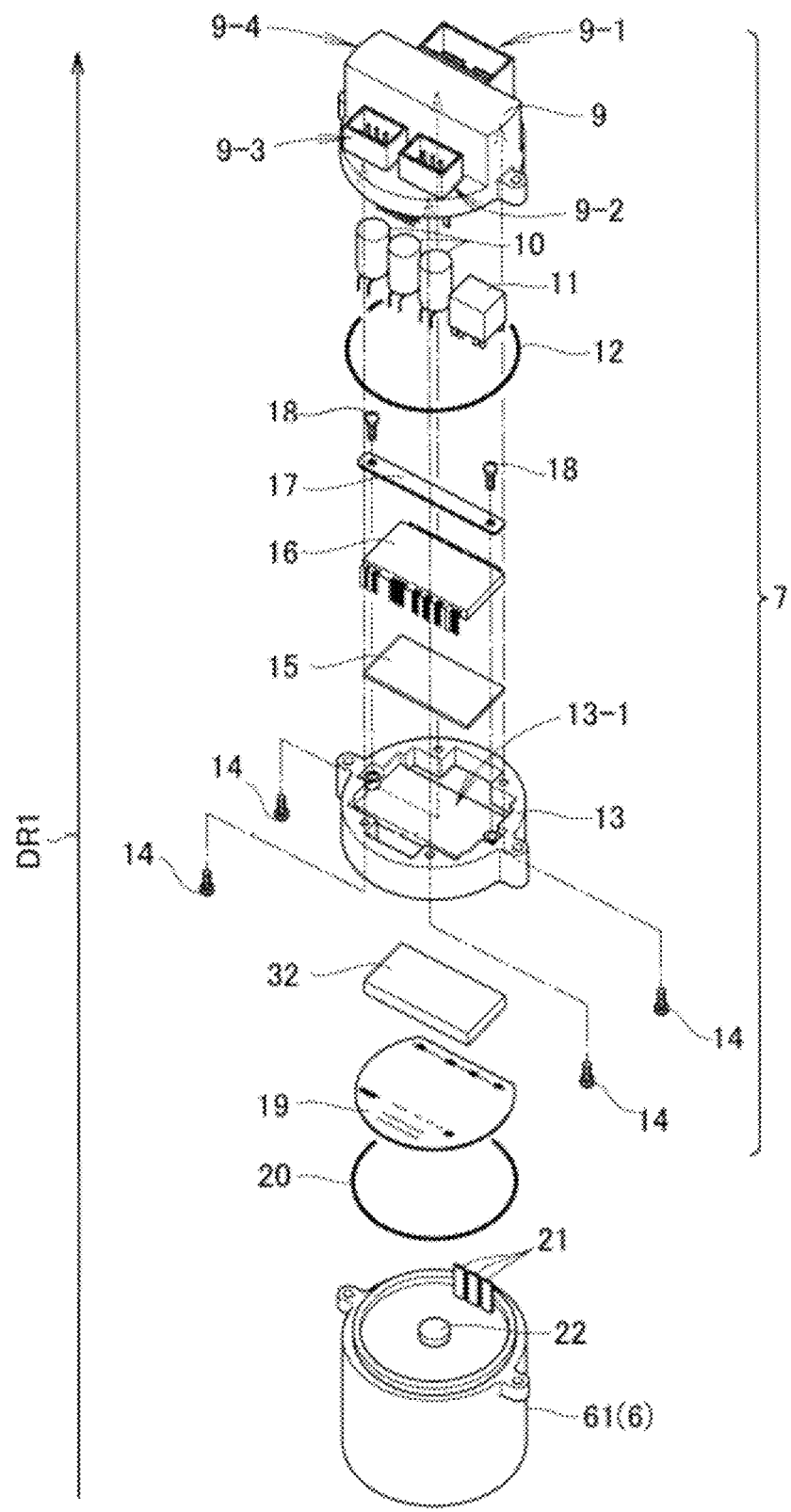
FIG. 14 is a diagram showing a sixth example of an exploded perspective view of the electronic control unit in FIG. 2.
Figure 15A:
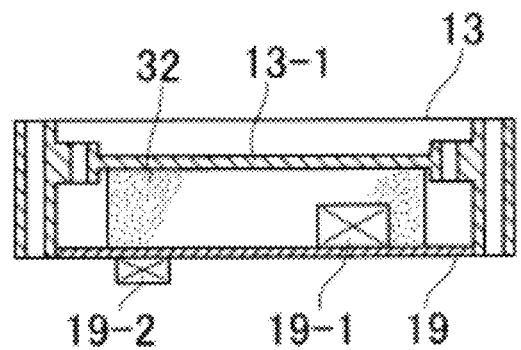
FIG. 15A is a diagram illustrating an arrangement of a heat sink, a heat conductive member and a control board in FIG. 14.
Figure 15B:
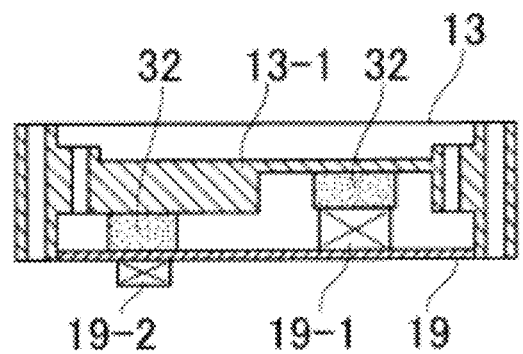
FIG. 15B is a diagram showing a variation of the heat sink and the heat conductive member in FIG. 15A.
Figure 15C:
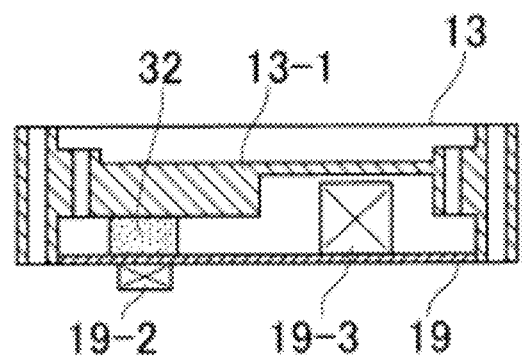
FIG. 15C is a diagram showing another variation of the heat conductive member in FIG. 15A.

FIG. 15A is a diagram illustrating an arrangement of the heat sink 13, the heat conductive member 32 and the control board 19 in FIG. 14. Wherein, in the configuration in FIG. 14, particularly, the power module 16, the control board 19 and the heat sink 13 are disposed in the direction (direction DR1) of the shaft 22 of the electric motor 6 in the order of the control board 19, the heat sink 13 and the power module 16. FIG. 15B shows a variation of the heat sink 13 and the heat conductive members 32 in FIG. 15A. FIG. 15C shows another variation of the heat conductive member 32 in FIG. 15A. In the example in FIG. 15A, the heat generating component 19-1 is disposed on, for instance, the surface of the control board 19, while the heat generating component 19-2 is disposed on, for instance, the rear surface of the control board 19. The heat generating components 19-1 and 19-2 on the control board 19 include the microcomputer 25, the regulator 24, and the predriver 28 in FIG. 3. In other words, in the example in FIG. 5(A), the two heat generating components 19-1 and 19-2 are shown. Alternatively, the number of heat generating components in close contact with the heat conductive member 32 may be one or three or more.

As shown in FIGS. 14 and 15A, a setting surface 13-1 on which the heat conductive member 32 is provided for the heat sink 13 is, for instance, flat. Here, the heat conductive member 32 may preliminarily include a concave portion such that the heat conductive member 32 guides, for instance, the heat generating component 19-1 or the control board 19 to be attached. Alternatively, the heat conductive member 32 may have a shape of, for instance, a rectangular parallelepiped that includes no concave portion and is an elastic member (see FIG. 14). Referring to FIG. 15A, the heat conductive member 32 is in close contact directly with the heat generating component 19-1, and indirectly with the heat generating component 19-2. In the case where the heat conductive member 32 is in close contact indirectly with the heat generating component 19-2, the heat conductive member 32 is in close contact directly with the main body (substrate itself) of the control board 19. Thus, the heat conductive member 32 can be disposed in conformity with the positions of the heat generating components 19-1 and 19-2 on the control board 19.

As shown in FIG. 15B, the setting surface 13-1 may have a convex portion (step) facing the heat generating component 19-2 such that the heat sink 13 or the setting surface 13-1 approaches, for instance, the heat generating component 19-2 on the control board 19. Even in situations where the length between the heat sink 13 or the setting surface 13-1 and the control board 19 is long, heat generated by the control board 19 is easily transferred to the heat conductive member 32. As show in FIG. 15C, the heat conductive member 32 is not necessarily in close contact with the component 19-3 of the control board 19. The component 19-3 of the control board 19 includes a component other than the heat generating component. In particular, components, such as capacitors, that have large heights can be disposed in the concave portion of the setting surface 13-1.

As shown in FIG. 15A, in the case where the control board 19 includes the multiple heat generating components 19-1 and 19-2, the heat conductive member 32 is in close contact with some heat generating components (at least two heat generating components) in an integrated manner. Alternatively, as shown in FIG. 15B, the heat conductive member 32 may be multiple heat conductive members. These heat conductive members can be in close contact individually with the control board 19. For instance, one of the two heat conductive members 32 may be in close contact with the heat generating component 19-1, and the other of the two heat conductive members 32 may be in close contact with, for instance, the heat generating component 19-2.

The present invention is not limited to the foregoing most preferred exemplary embodiment. Those skilled in the art can easily modify the foregoing most preferred exemplary embodiment within the extent included in the scope of the claims.

Next, embodiments related to the three preferable embodiments described in SUMMARY OF THE INVENTION of this specification are described later in an organized manner.

In the explanation below, a power module is disclosed as a module defined by molding or casting an integrated circuit including the inverter circuit with material including resin or ceramic. However the power module can be given in exchange for a circuit board which includes the inverter circuit and the like. A word "power converter" is used as a word which can be given in exchange for a power module or power circuit board.

The first embodiment described in SUMMARY OF THE INVENTION pertains to the following related embodiments.

A first related embodiment is the motor drive device of the first to third embodiments wherein the external connector includes at least a power source connector and a signal connector and the external connector is integrally molded into a unitarily form by material including resin.

The external connector thus has the structure unitarily formed as one component with resin or the like. Accordingly, assembling the motor drive device can be facilitated easily. Since connection to the outside is made by the connector, electric connection to the outside can be simply and reliably secured. Thus, the motor drive device can be easily mounted in the electric power steering device, and reliability is improved.

A second related embodiment is the motor drive device of the first to third embodiments wherein the external connector has at least a bus bar electrically connected to the power source, the external connector includes a concave-shaped storing portion concave in the direction of the rotating shaft, the storing portion stores at least a stored component which includes a capacitor or a noise filter, and the stored component is electrically connected to the bus bar.

In this device, a space for an external connector and a space for capacitors and a noise filter are necessary. These components have larger external shapes than other components used in this device have. The external connector requires at least a certain space for securely connecting, to the internal circuit, the power source line and signal line supplied from the outside. Meanwhile, this motor drive device is required to have a compact external shape in conformity with improvement in vehicle performance. To satisfy these requirements, in this second related embodiment, large components including the capacitors and the noise filter are disposed in a manner overlapping with intervals of spaces occupied by the external connectors necessary for this motor drive device. Thus, the internal space of this motor drive device is effectively utilized, and the small device can be achieved.

Furthermore, in this second related embodiment, the large components including the capacitors and the noise filter, and the bus bar connected to the power source are directly connected in or adjacent to the external connector by means, such as welding or soldering. Conventionally, such large components are disposed on the control board, or the power board mounted with the inverter circuits, and electrically connected. Accordingly, these large components occupy the space on the board. On the contrary, in this second related embodiment, these large components are arranged in the space in the external connector, and electrically connected to the bus bar, thereby allowing the large space to be effectively utilized. Accordingly, the motor drive device having a much smaller size than the conventional art can be achieved.

Furthermore, a third related embodiment is the motor drive device of the first to third embodiments wherein the controller further comprises a radiator plate, and the power module or power converter is disposed between the heat sink and the radiator plate.

The motor drive device for the power steering device requires a large drive power. To meet this requirement, large current is required to supply to power elements, such as the inverter circuits, thereby causing a problem of heat generation by the power module or power converter mounted with power elements. In order to efficiently cool the heating power module, this motor drive device includes not only the heat sink having the structure made by metal die casting but also the metal radiator plate.

In another aspect of the third related embodiment, wherein the radiator plate is in contact with at least any of the power module or power converter and the heat sink. This contact allows heat in the power module or power converter to be efficiently transferred to the heat sink. As a result, efficient cooling is performed through not only the radiator plate but also the heat sink.

Another aspect of the third related embodiment further comprising a heat conductive member between the power module or power converter and the radiator plate or between the power module or power converter and the heat sink, wherein the heat conductive member is in contact with at least any of the power module or power converter, the radiator plate, and the heat sink directly or indirectly via another member.

In order to suppress increase in temperature of the power module or power converter, a heat conductive member that includes plastic material or a fluid member and has a high thermal conductivity and can easily increase an area in contact with another component is brought into contact directly or indirectly with the power module or power converter. Thus, the heat in the power module or power converter is transferred directly or indirectly to the radiator plate or the heat sink, thereby increasing cooling efficiency.

In another aspect of the third related embodiment, the power module or power converter is fixed to the controller case by a fixing mechanism provided on the radiator plate. The fixing mechanism provided on the radiator plate can fix the power module or power converter to the main body of the motor drive device. This negates the need to provide the power module or power converter with a structure for attachment to the main body, thereby allowing the size of the power module or power converter to be reduced. Furthermore, the fixing mechanism is a screw. Fixation can be easily made by the screw.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor drive device for an electric power steering which is supplied with a power source from an outside and which includes a connection which connects an external signal to and from the outside, comprising:
   a motor which includes a rotating shaft and is stored in a motor case;
   a controller which is disposed adjacent to the motor in a direction of the rotating shaft and controls the motor; and
   an external connector which includes a power source connector that receives the power source and/or a signal connector that is connected to the external signal,
   wherein the controller includes at least:
      a controller case which includes a flat plate extending in a direction perpendicular to the rotating shaft, and an external wall having a cylindrical shape in a circumferential direction;
      a power module or power converter with a component including an inverter circuit which supplies the motor with a drive power;
      a control board which controls the power module or power converter and the motor; and
      a heat sink which is made of metal, wherein,
   the motor case and the controller case are formed unitarily by mutually coupling portions or all of the motor case and the control unit case in the direction of the rotating shaft directly or indirectly via a connection member,
   the external connector includes a connection port which is connected to the power source and the external signal in the direction of the rotating shaft,
   a portion or an entirety of the external wall and a portion or an entirety of the flat plate of the controller case are defined by the heat sink,
   all portions of the controller case and the external connector are provided radially at or radially inward from an outermost radial periphery of the motor case,
   the heat sink is exposed outside of the motor drive device to transmit heat generated in the inverter circuit to outside air, and
   the controller is waterproof and the controller case is attached to the motor case in a waterproof manner.

2. The motor drive device according to claim 1,
   wherein the external connector includes at least a power source connector and a signal connector and the external connector is integrally molded into a unitarily form by material including resin.

3. The motor drive device according to claim 1,
   wherein the external connector has at least a bus bar electrically connected to the power source,
   the external connector includes a concave-shaped storing portion concave in the direction of the rotating shaft,
   the storing portion stores at least a stored component which includes a capacitor or a noise filter, and
   the stored component is electrically connected to the bus bar.

4. The motor drive device according to claim 1,
   wherein the controller further comprises a radiator plate, and
   the power module or power converter is disposed between the heat sink and the radiator plate.

5. The motor drive device according to claim 4,
   wherein the radiator plate is in contact with at least any of the power module or power converter and the heat sink.

6. The motor drive device according to claim 4, further comprising
   a heat conductive member between the power module or power converter and the radiator plate, or between the power module or power converter and the heat sink,
   wherein the heat conductive member is in contact with at least any of the power module or power converter, the radiator plate, and the heat sink directly or indirectly via another member.

7. The motor drive device according to claim 4,
   wherein the power module or power converter is fixed to the controller case by a fixing mechanism provided on the radiator plate.

8. The motor drive device according to claim 7,
   wherein the fixing mechanism is a screw.

9. The motor drive device according to claim 1,
   wherein the controller further comprises a radiator plate, and
   the radiator plate, the power module or power converter, the heat sink, and the control board are disposed between the external connector and the motor in the direction of the rotating shaft from a side of the motor in an order of the control board, the heat sink, the power module or power converter, and the radiator plate.

10. The motor drive device according to claim 1,
    wherein the power module or power converter, the heat sink, and the control board are disposed between the external connector and the motor in the direction of the rotating shaft from a side of the motor in an order of the control board, the power module or power converter, and the heat sink.

* * * * *